US011765261B2

(12) United States Patent
Colston

(10) Patent No.: US 11,765,261 B2
(45) Date of Patent: *Sep. 19, 2023

(54) MOBILE APPLICATION FOR CONTROLLING OUTDOOR GRILL

(71) Applicant: Traeger Pellet Grills, LLC, Salt Lake City, UT (US)

(72) Inventor: Michael Virgil Colston, Stephensville, MI (US)

(73) Assignee: Traeger Pellet Grills, LLC., Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/658,018

(22) Filed: Apr. 5, 2022

(65) Prior Publication Data

US 2022/0232117 A1 Jul. 21, 2022

Related U.S. Application Data

(63) Continuation of application No. 16/947,366, filed on Jul. 29, 2020, which is a continuation of application
(Continued)

(51) Int. Cl.
*H04M 1/00* (2006.01)
*H04M 1/72415* (2021.01)
(Continued)

(52) U.S. Cl.
CPC ....... *H04M 1/72415* (2021.01); *A47J 36/321* (2018.08); *G08C 17/02* (2013.01);
(Continued)

(58) Field of Classification Search
CPC . H04M 1/72415; H04W 4/80; H04W 68/005; A47J 36/321; G08C 17/02;
(Continued)

(56) References Cited

U.S. PATENT DOCUMENTS 3,448,679 A 6/1969 Holka et al.
4,036,995 A 7/1977 Koether et al.
(Continued)

FOREIGN PATENT DOCUMENTS

CA 2776929 A1 11/2013
CN 102625007 A 8/2012
(Continued)

OTHER PUBLICATIONS

SmartThings, "Easy & Affordable Smart Home Automation" retrieved from http://www.smartthings.com on Jun. 19, 2014, 5 pages.
(Continued)

*Primary Examiner* — Khai M Nguyen
(74) *Attorney, Agent, or Firm* — TraskBritt

(57) ABSTRACT

Embodiments are directed to controlling an electronically-controlled appliance using a software application and providing a user interface for controlling an electronically-controlled appliance. In one scenario, a computer system receives an indication from a remote computing system indicating that an electronically-controlled appliance is communicably connected to the remote computing system. The computer system provides a notification in the software application indicating that the electronically-controlled appliance is available to receive instructions, and receives a user input at the software application indicating that certain functions are to be performed by the electronically-controlled appliance. The computer system further generates instructions configured to control the electronically-controlled appliance based on the functions specified in the received user input, and sends the generated instructions to the electronically-controlled appliance to perform the specified functions. These functions are then interpreted and carried out on the electronically-controlled appliance via the hardware controller.

17 Claims, 7 Drawing Sheets

Related U.S. Application Data

No. 16/432,798, filed on Jun. 5, 2019, now Pat. No. 10,791,208, which is a continuation-in-part of application No. 16/193,235, filed on Nov. 16, 2018, now Pat. No. 10,951,751, which is a continuation of application No. 15/510,996, filed as application No. PCT/US2016/024737 on Mar. 29, 2016, now Pat. No. 10,218,833, said application No. 16/193,235 is a continuation-in-part of application No. 15/114,744, filed as application No. PCT/US2016/039271 on Jun. 24, 2016, now Pat. No. 10,674,866, said application No. 16/193,235 is a continuation-in-part of application No. 15/511,319, filed as application No. PCT/US2016/026736 on Apr. 8, 2016, now Pat. No. 10,455,022.

(60) Provisional application No. 62/245,535, filed on Oct. 23, 2015, provisional application No. 62/245,530, filed on Oct. 23, 2015, provisional application No. 62/245,549, filed on Oct. 23, 2015.

(51) Int. Cl.

| | | |
|---|---|---|
| *H04L 67/125* | (2022.01) | |
| *G08C 17/02* | (2006.01) | |
| *H04W 68/00* | (2009.01) | |
| *A47J 36/32* | (2006.01) | |
| *H04W 4/80* | (2018.01) | |
| *H04Q 9/00* | (2006.01) | |

(52) U.S. Cl.
CPC ............ *H04L 67/125* (2013.01); *H04Q 9/00* (2013.01); *H04W 4/80* (2018.02); *H04W 68/005* (2013.01); *G08C 2201/30* (2013.01); *G08C 2201/42* (2013.01); *G08C 2201/93* (2013.01)

(58) Field of Classification Search
CPC ............ G08C 2201/30; G08C 2201/42; G08C 2201/93; H04L 67/125; H04Q 9/00
See application file for complete search history.

(56) References Cited

U.S. PATENT DOCUMENTS

| | | | |
|---|---|---|---|
| 4,409,662 A | 10/1983 | Rao | |
| 4,474,107 A | 10/1984 | Cothran | |
| 4,809,190 A | 2/1989 | Homer et al. | |
| 4,837,414 A | 6/1989 | Edamula | |
| 5,360,965 A | 11/1994 | Ishii et al. | |
| 5,429,110 A | 7/1995 | Burke et al. | |
| 6,223,737 B1 | 5/2001 | Buckner | |
| 6,257,227 B1 | 7/2001 | Harbin | |
| 6,583,991 B1 | 6/2003 | Furuta et al. | |
| 7,168,363 B1 | 1/2007 | Brown | |
| 7,526,539 B1 | 4/2009 | Hsu | |
| D605,216 S | 12/2009 | Nakano | |
| 7,663,502 B2 | 2/2010 | Breed | |
| 7,703,389 B2 | 4/2010 | Mclemore et al. | |
| 7,707,606 B2 | 4/2010 | Hofrichter et al. | |
| 7,743,012 B2 | 6/2010 | Chambers et al. | |
| 7,937,484 B2 | 5/2011 | Julia et al. | |
| 8,091,543 B2 | 1/2012 | Baumann et al. | |
| 8,267,078 B2 * | 9/2012 | Kuntz ................ A47J 37/0786 126/10 |
| 8,295,851 B2 | 10/2012 | Finnegan et al. | |
| 8,297,271 B2 | 10/2012 | Cedar et al. | |
| 8,539,567 B1 | 9/2013 | Logue et al. | |
| 8,730,038 B2 | 5/2014 | Durian | |
| 8,766,144 B2 | 7/2014 | Mcloughlin et al. | |
| 8,855,793 B2 | 10/2014 | Bhargava et al. | |
| 8,880,047 B2 | 11/2014 | Konicek et al. | |
| 8,931,400 B1 | 1/2015 | Allen | |
| 9,149,058 B2 | 10/2015 | Bilet et al. | |
| 9,152,737 B1 * | 10/2015 | Micali ................ G01R 21/133 |
| 9,164,867 B2 | 10/2015 | Ebrom et al. | |
| 9,178,991 B2 | 11/2015 | Finnegan et al. | |
| 9,210,192 B1 | 12/2015 | Kim et al. | |
| 9,414,444 B2 | 8/2016 | Libman et al. | |
| 9,451,031 B2 | 9/2016 | Graziano et al. | |
| 9,497,572 B2 | 11/2016 | Britt et al. | |
| 9,672,670 B2 | 6/2017 | Menkveld | |
| 9,759,429 B2 * | 9/2017 | Tucker ................ F24B 13/04 |
| 9,842,442 B2 | 12/2017 | Konicek et al. | |
| 9,928,672 B2 | 3/2018 | Jablokov et al. | |
| 10,158,720 B2 | 12/2018 | Colston | |
| 10,187,494 B2 | 1/2019 | Stewart et al. | |
| 10,194,770 B2 | 2/2019 | Young et al. | |
| 10,213,046 B2 | 2/2019 | Nonaka et al. | |
| 10,218,833 B2 | 2/2019 | Colston | |
| 10,292,531 B1 | 5/2019 | Hancock et al. | |
| 10,388,141 B2 | 8/2019 | Allen, Sr. | |
| 10,395,506 B2 | 8/2019 | Allen, Sr. | |
| 10,444,723 B2 | 10/2019 | Young et al. | |
| 10,628,464 B2 | 4/2020 | Finnegan et al. | |
| 10,674,866 B2 | 6/2020 | Colston | |
| 10,846,313 B2 | 11/2020 | Finnegan et al. | |
| D924,006 S | 7/2021 | Gillespie et al. | |
| D926,056 S | 7/2021 | Lagerstedt et al. | |
| 11,055,937 B2 | 7/2021 | Konicek et al. | |
| 11,058,132 B2 | 7/2021 | Wang | |
| 11,060,735 B2 | 7/2021 | Bhogal et al. | |
| 11,067,284 B2 | 7/2021 | Measom et al. | |
| 11,071,175 B2 | 7/2021 | Schmeski | |
| 11,102,607 B2 | 8/2021 | Konicek et al. | |
| 11,259,140 B2 | 2/2022 | Konicek et al. | |
| 2003/0015188 A1 | 1/2003 | Harbin | |
| 2003/0037681 A1 | 2/2003 | Zhu et al. | |
| 2003/0120972 A1 | 6/2003 | Matsushima et al. | |
| 2004/0182254 A1 | 9/2004 | Gershon | |
| 2005/0034716 A1 | 2/2005 | Harbin | |
| 2005/0203647 A1 | 9/2005 | Landry et al. | |
| 2005/0262226 A1 | 11/2005 | Holloway et al. | |
| 2006/0041655 A1 | 2/2006 | Holloway et al. | |
| 2006/0144384 A1 | 7/2006 | Santagata | |
| 2006/0254432 A1 | 11/2006 | Mclemore | |
| 2007/0001012 A1 | 1/2007 | Kim et al. | |
| 2007/0012307 A1 | 1/2007 | Wiker et al. | |
| 2007/0056577 A1 | 3/2007 | Chang | |
| 2007/0067431 A1 | 3/2007 | Yoshihara et al. | |
| 2007/0137537 A1 | 6/2007 | Drisdelle et al. | |
| 2007/0180400 A1 | 8/2007 | Zotov et al. | |
| 2007/0221205 A1 | 9/2007 | Landon | |
| 2007/0233674 A1 | 10/2007 | De Lury et al. | |
| 2008/0057929 A1 * | 3/2008 | Min ................ G08C 17/02 455/418 |
| 2008/0060632 A1 | 3/2008 | Leverty | |
| 2009/0000493 A1 | 1/2009 | Mosher, II | |
| 2009/0006180 A1 | 1/2009 | Hameen-Anttila | |
| 2010/0012165 A1 | 1/2010 | Bedard | |
| 2010/0037806 A1 | 2/2010 | Duignan et al. | |
| 2010/0132692 A1 | 6/2010 | Shaffer | |
| 2010/0134620 A1 | 6/2010 | Bielstein | |
| 2010/0147823 A1 | 6/2010 | Anderson et al. | |
| 2010/0218754 A1 | 9/2010 | Kuntz | |
| 2010/0247721 A1 | 9/2010 | Mcghee et al. | |
| 2010/0251973 A1 | 10/2010 | Dongo et al. | |
| 2011/0002677 A1 | 1/2011 | Cochran et al. | |
| 2012/0060819 A1 | 3/2012 | Hunt et al. | |
| 2012/0086563 A1 * | 4/2012 | Arling ................ G08C 17/00 340/12.52 |
| 2012/0089835 A1 | 4/2012 | Peckover | |
| 2012/0116820 A1 | 5/2012 | English et al. | |
| 2012/0170247 A1 | 7/2012 | Do | |
| 2012/0204131 A1 | 8/2012 | Hoang et al. | |
| 2012/0210268 A1 | 8/2012 | Hilbrink et al. | |
| 2012/0278454 A1 | 11/2012 | Stewart et al. | |
| 2012/0310416 A1 | 12/2012 | Tepper et al. | |
| 2013/0061765 A1 | 3/2013 | Reinhart | |
| 2013/0171304 A1 | 7/2013 | Huntley | |
| 2013/0188097 A1 | 7/2013 | Smith | |
| 2013/0265159 A1 | 10/2013 | Durian | |

(56) References Cited

U.S. PATENT DOCUMENTS

| | | |
|---|---|---|
| 2013/0277353 A1 | 10/2013 | Joseph et al. |
| 2014/0081433 A1 | 3/2014 | Cheong et al. |
| 2014/0098247 A1 | 4/2014 | Rao et al. |
| 2014/0121786 A1 | 5/2014 | Chen et al. |
| 2014/0148969 A1 | 5/2014 | Graziano et al. |
| 2014/0150698 A1 | 6/2014 | Walker |
| 2014/0170275 A1 | 6/2014 | Bordin |
| 2014/0232903 A1* | 8/2014 | Oshima .............. H04B 10/1143 348/229.1 |
| 2014/0251987 A1* | 9/2014 | Reay ...................... F24C 7/088 219/446.1 |
| 2014/0295822 A1 | 10/2014 | Koo et al. |
| 2014/0326233 A1 | 11/2014 | Traeger |
| 2014/0365018 A1 | 12/2014 | Kusukame et al. |
| 2015/0012864 A1* | 1/2015 | Goodwin .............. G06F 3/0481 715/771 |
| 2015/0019342 A1 | 1/2015 | Gupta |
| 2015/0025687 A1* | 1/2015 | Henderson ............. A23B 4/052 700/275 |
| 2015/0029342 A1 | 1/2015 | Im et al. |
| 2015/0056344 A1 | 2/2015 | Luckhardt |
| 2015/0081086 A1 | 3/2015 | Hallowell et al. |
| 2015/0134727 A1 | 5/2015 | Lee et al. |
| 2015/0136113 A1 | 5/2015 | Polter et al. |
| 2015/0156031 A1 | 6/2015 | Fadell et al. |
| 2015/0169260 A1 | 6/2015 | Mcleod et al. |
| 2015/0178721 A1 | 6/2015 | Pandiarajan et al. |
| 2015/0213711 A1 | 7/2015 | Rezvani et al. |
| 2015/0229713 A1 | 8/2015 | Lu et al. |
| 2015/0230056 A1 | 8/2015 | Shin et al. |
| 2015/0285513 A1 | 10/2015 | Matarazzi et al. |
| 2015/0304157 A1 | 10/2015 | Kim et al. |
| 2015/0312398 A1 | 10/2015 | Li |
| 2015/0330658 A1 | 11/2015 | Filson et al. |
| 2015/0346952 A1 | 12/2015 | Yang et al. |
| 2016/0037966 A1 | 2/2016 | Chin et al. |
| 2016/0051078 A1 | 2/2016 | Jenkins et al. |
| 2016/0063013 A1 | 3/2016 | Finnegan et al. |
| 2016/0072638 A1 | 3/2016 | Amer et al. |
| 2016/0080041 A1 | 3/2016 | Schultz et al. |
| 2016/0088049 A1 | 3/2016 | Seed et al. |
| 2016/0147207 A1 | 5/2016 | Park et al. |
| 2016/0191267 A1 | 6/2016 | Zhang et al. |
| 2016/0198885 A1 | 7/2016 | Logan et al. |
| 2016/0218884 A1 | 7/2016 | Ebrom et al. |
| 2016/0255999 A1 | 9/2016 | Mcadams et al. |
| 2016/0274611 A1 | 9/2016 | Amer et al. |
| 2016/0327263 A1 | 11/2016 | Traeger |
| 2016/0335874 A1 | 11/2016 | Allen, Sr. |
| 2016/0371961 A1 | 12/2016 | Narang et al. |
| 2016/0374501 A1* | 12/2016 | Logan ...................... A47J 36/00 426/231 |
| 2017/0020324 A1 | 1/2017 | Young et al. |
| 2017/0025861 A1 | 1/2017 | Lee et al. |
| 2017/0135159 A1* | 5/2017 | Sorenson ................. H05B 3/70 |
| 2017/0164783 A1 | 6/2017 | Sauerwein et al. |
| 2017/0176019 A1 | 6/2017 | Bhogal et al. |
| 2017/0243040 A1 | 8/2017 | Burkhart et al. |
| 2017/0289257 A1 | 10/2017 | Colston |
| 2017/0289336 A1 | 10/2017 | Colston |
| 2018/0125296 A1 | 5/2018 | Gafford |
| 2018/0125396 A1 | 5/2018 | Lansdorp et al. |
| 2018/0220099 A1 | 8/2018 | Li |
| 2018/0239316 A1 | 8/2018 | Toscano et al. |
| 2018/0310361 A1 | 10/2018 | Sorenson et al. |
| 2019/0282032 A1 | 9/2019 | Colston et al. |
| 2019/0289118 A1 | 9/2019 | Colston |
| 2019/0289119 A1 | 9/2019 | Colston |
| 2019/0289121 A1 | 9/2019 | Colston |
| 2019/0290064 A1 | 9/2019 | Colston et al. |
| 2019/0293295 A1 | 9/2019 | Colston et al. |
| 2020/0053160 A1 | 2/2020 | Colston |
| 2020/0103120 A1 | 4/2020 | Bhogal et al. |
| 2020/0214503 A1 | 7/2020 | Altenritter |
| 2021/0026876 A1 | 1/2021 | Finnegan et al. |
| 2021/0207812 A1 | 7/2021 | Bhogal et al. |
| 2021/0215344 A1 | 7/2021 | Eckhardt et al. |
| 2022/0050861 A1 | 2/2022 | Finnegan et al. |

FOREIGN PATENT DOCUMENTS

| | | | |
|---|---|---|---|
| CN | 202392848 U | 8/2012 | |
| CN | 103138980 A | 6/2013 | |
| CN | 203914599 U | 11/2014 | |
| CN | 104539492 A | 4/2015 | |
| CN | 204270170 U | 4/2015 | |
| CN | 104615456 A | 5/2015 | |
| CN | 204480081 U | 7/2015 | |
| CN | 107251507 A | 10/2017 | |
| DE | 102008043722 A1 | 5/2010 | |
| DE | 102012204229 | 9/2013 | |
| EP | 0298858 A1 | 1/1989 | |
| EP | 0899512 | 3/1999 | |
| EP | 3366023 A1 | 8/2018 | |
| JP | 2003-172578 A | 6/2003 | |
| JP | 2004-229266 A | 8/2004 | |
| JP | 2005-341080 A | 8/2005 | |
| JP | 2006-163669 A | 6/2006 | |
| JP | 2006-201994 A | 8/2006 | |
| JP | 2007-004579 A | 1/2007 | |
| JP | 2007-053530 A | 3/2007 | |
| JP | 2010-108412 A | 5/2010 | |
| JP | 2010-519492 A | 6/2010 | |
| JP | 2012-032949 A | 2/2012 | |
| JP | 2012-141658 A | 7/2012 | |
| JP | 2015-017711 A | 1/2015 | |
| KR | 10-2002-0036478 A | 5/2002 | |
| KR | 10-2014-0008927 A | 1/2014 | |
| KR | 10-1457087 B1 | 10/2014 | |
| KR | 10-2014-0135318 A | 11/2014 | |
| KR | 10-1534514 B1 | 7/2015 | |
| NZ | 739399 A | 6/1998 | |
| WO | 2007/070873 A2 | 6/2007 | |
| WO | 2012/171242 A1 | 12/2012 | |
| WO | 2014/086487 A1 | 6/2014 | |
| WO | WO-2014208099 A1 * | 12/2014 | ............. G08C 17/02 |
| WO | WO-2015101992 A2 * | 7/2015 | ............ G01J 3/0205 |
| WO | 2015/137740 A1 | 9/2015 | |
| WO | 2016/171775 A1 | 10/2016 | |
| WO | 2017/069799 A1 | 4/2017 | |
| WO | 2017/069801 A1 | 4/2017 | |
| WO | 2017/069813 A1 | 4/2017 | |
| WO | 2020/154022 A1 | 7/2020 | |
| WO | 2020/227522 A1 | 11/2020 | |

OTHER PUBLICATIONS

SmartThings Product, retrieved from http://www.smartthings.com/product/ on Jun. 19, 2014, 9 pages.

SmartThings Hub, retrieved from https://shop.smartthings.com/#!/products/smartthings-hub on Jun. 19, 2014, 16 pages.

SmartThings GE Light & Appliance Plug-and-Control Power Outlet, retrieved from https://shop.smartthings.com/#!/products/ge-z-wave-wireless-lighting-control-lamp-module on Jun. 19, 2014, 14 pages.

Quirky, "Shop for products invented by real people" retrieved from http://www.quirky.com on Jul. 2, 2014, 1 page.

Quirky Pivot Power Genius, retrieved from http://www.quirky.com/shop/633-pivot-power-genius-power-control-from-your-smart-phone on Jul. 2, 2014, 6 pages.

Quirky Spotter, retrieved from http://www.quirky.com/shop/609-spotter-multi-purpose-sensor on Jul. 2, 2014, 4 pages.

Electric Imp, "Connectivity Made Simple" retrieved from http://electricimp.com/ on Jun. 19, 2014, 2 pages.

Electric Imp Product, retrieved from http://electricimp.com/product/ on Jun. 19, 2014, 3 pages.

Electric Imp, "The Interactive imp: how to manage communication between app, agent and device" retrieved from http://electricimp.com/docs/resources/interactive/ on Jun. 19, 2014, 11 pages.

Electric Imp Lockitron, retrieved from http://electricimp.com/productgallery/lockitron/ on Jun. 19, 2014, 2 pages.

(56) References Cited

OTHER PUBLICATIONS

Electric Imp. "How to run an imp offline: Making-and breaking-Internet connections" retrieved from http://eletricimp.com/docs/resources/offline/ on Jun. 19, 2014, 9 pages.
Electric Imp, Inc. "specification: imp001 version 20140226" http://www.electricimp.com/ (2014) 14 pages.
Electric Imp, Inc. "specification: imp002 version 20140226" http://www.electricimp.com/ (2014) 18 pages.
Get Gookin' -Our Favorite Grills', in Modern in Denver [online]. Posted Jun. 1, 2015 [retireved on Jul. 6, 2018], Retrieved from the Internet: <URL:https://www.modernindenver.com/2015/06/grills/>, 8 pages.
GMG App User Guide. Datasheet [online]. Green Mountain Grills LLC, Jul. 28, 2014. [retrieved Sep. 11, 2018) Retreived from Internet: <https://greenmountaingrills.com/wp-content/uploads/2014/08/GMG-Singles-.pdf>, 20 pages.
GMG Product Brochure Publication (GMG Publication), https://web.archive.org/web/20101216012026/http:/www.greenmountaingrills.com:80/grills.html, retrieved Jan. 29, 2019, 3 pages.
GMG Products LLC, "Dealer Price List, Aug. 1, 2015". 1 page.
Good, Max. 'Saber Edge Grill Review', in Amazing Ribs [online], [retrieved on Jul. 6, 2018], Retrieved from the Internet: <URLhttps://amazingribs.com/grill/saber-edge-grill-review>, 9 pages.
Great Britain Search and Examination Report from Great Britain Application No. 2116424.9, dated Dec. 22, 2021, 7 pages.
Green Mountain Grills Announces Server Mode Is Now Available. Press Release [online]. Green Mountain Grills LLC, Dec. 5, 2017. [retrieved Sep. 11, 2018] Retrieved from Internet: <https://www.prnewswire.com/news-releases/green-mountain-grills-announces-server-mode-is-now-available-300567051.html>, 2 pages.
Green Mountain Pellet Grill—Jim Bowie Model—Daniel Boone Model. Datasheet [online]. Green Mountain Grills LLC, Oct. 7, 2010. Retreived from Internet: <https://www.bbqgrills.co.nz/wp-content/uploads/2015/06/preOctober2010Manual.pdf>.
Hardwood Pellet Grills. Datasheet [online]. Green Mountain Grills LLC, Apr. 29, 2016. [retrieved Sep. 11, 2018] Retrieved from Internet: <https://greenmountaingrills.com/wp-content/uploads/2016/04/GMG_OperatingApp_Manual_Web.pdf>, 49 pages.
IL Office Action dated Aug. 30, 2020 for IL Application No. 253495, 10 pages.
International Preliminary Report on Patentability received for PCT Patent Application No. PCT/US2016/024737, dated May 3, 2018, 10 pages.
International Preliminary Report on Patentability received for PCT Patent Application No. PCT/US2016/026736, dated May 3, 2018, 11 pages.
International Preliminary Report on Patentability received for PCT Patent Application No. PCT/US2016/039271, dated May 3, 2018, 12 pages.
International Search Report for application No. PCT/US2016/039271 dated Sep. 23, 2016.
International Search Report for application No. PCT/US2016026736 dated Jul. 8, 2016.
International Search Report for International Application No. PCT/US2016/024737, dated Jul. 8, 2016, 3 pages.
International Search Report for International Application No. PCT/US2016/026736, dated Jul. 8, 2016, 3 pages.
International Search Report for International Application No. PCT/US2016/039271, dated Sep. 23, 2016, 3 pages.
International Written Opinion for International Application No. PCT/US2016/024737, dated Jul. 8, 2016, 8 pages.
International Written Opinion for International Application No. PCT/US2016/026736, dated Jul. 8, 2016, 9 pages.
International Written Opinion for International Application No. PCT/US2016/039271, dated Sep. 23, 2016, 10 pages.
Jim Mahoney: "CyberCook—CyberQ WiFi Software : 2015 Blog", Blog Grillin' & Smoking BBQ, Feb. 1, 2015 (Feb. 1, 2015), pp. 1-26, XP055478026, us Retrieved from the Internet: URL:http://www.grillinsmokin.net/blogsall/blog 2015/files/cybercook-cyber -wifi -soft ware.php [retrieved on May 24, 2018].

Korean Notice of Preliminary Rejection from Korean Application No. 10-2017-7015558, dated Dec. 6, 2021, 13 pages.
Lynx Smart Grill User Manual (archived May 21, 2015) 48 pages.
MAK Grills Mobile Web Client Screenshot, MG_00000191, (2013) 1 page.
MAK Grills, MAK Grills Mobile—Installation and Setup Video, available at: https://www.youtube.com/watch?v=hitrrKyawME, May 22, 2013. Document includes one screenshot image from video.
MAK Grills, MAK Grills Mobile Operating Instructions-4 Star Grill Owners, MG_00000183-87, (2013) 5 pages.
MatthewC: "[Review] "Daniel Boone" Green Mountain Grill with WiFi—NZ TechBlog", May 9, 2015 (May 9, 2015), XP055577976 Retrieved from the Internet: URL:http://nztechblog.net/2015/05/09/review-daniel-boone-green-mountain-grill-with-wifi/[retrieved on Apr. 5, 2019], 17 pages.
Michael E. Porter & James E. Heppelmann, How Smart, Connected Products Are Transforming Competition, Harv. Bus. Rev. 65-88 (Nov. 2014), 28 pages.
Moataz Soliman el al., Smart Home: Integrating Internet of Things with Web Services and Cloud Computing, 2013 IEEE Int'l Conf. on Cloud Computing Tech. & Sci. 317-320 (2013).
Monitor All Aspects of Grill Performance From Your Smart Phone [online] Saber Grills, 2015 [retrieved on Jul. 6, 2018] Retrieved from the Internet: <URL:https://sabergrilss.com/Edge/index.html>, 1 page.
Murata Manufacturing Co., Ltd. "WiFi Module Data Sheet, Broadcom BCM43362 WiFi + ST Micro STM32F405 MCU, Tenative PIN: LBWA1ZV1CD-716" http://electricimp.com/docs/attachments/hardware/datasheets/imp003_LBWA1ZV1CD_060314.pdf Feb. 26, 2018, 24 pages.
NO Office Action dated Sep. 4, 2019 for NO Application No. 20170757, 2 pages.
Non-Final Office Action for U.S. Appl. No. 15/511,319 dated Dec. 20, 2018,63 pages.
Non-Final Office Action for U.S. Appl. No. 15/114,744 dated Feb. 19, 2019, 67 pages.
Non-Final Office Action for U.S. Appl. No. 15/510,996 dated May 11, 2018, 45 pages.
Non-Final Office Action for U.S. Appl. No. 16/193,295 dated Dec. 26, 2018, 31 pages.
Notice of Allowance for U.S. Appl. No. 15/510,996, dated Aug. 29, 2018, 17 pages.
Notice of Allowance for U.S. Appl. No. 15/954,199 dated Jul. 5, 2018, 23 pages.
Office Action dated Jul. 18, 2018, Norwegian IP Office, App No. NO 20170757, 2 pages.
Patent Owner's Preliminary Responce, PAPER 10, filed on Apr. 18, 2019, by the patentowner, in the matter of *GMG Products LLC* v. *Traeger Pellet Grills, LLC, PGR* Trial No. PGR2019-00024 regarding U.S. Pat. No. 10,158,720, 47 pages.
Patent Owner's Preliminary Responce, PAPER 7, filed on Jun. 5, 2019, by the patentowner, in the matter of *GMG Products LLC* v. *Traeger Pellet Grills, LLC, PGR* Trial No. PGR2019-00034 regarding U.S. Pat. No. 10,218,833, dated Mar. 5, 2019, 03 pages.
Patent Owner's Sur-Reply in Support of Patent Owner's Preliminary Responce, PAPER 15, filed on May 24, 2019, by the patentowner, in the matter of *GMG Products LLC* v. *Traeger Pellet Grills, LLC, PGR* Trial No. PGR2019-00024 regarding U.S. Pat. No. 10,158,720, 07 pages.
Petition by Green Mountain Grills for Post Grant Review of U.S. Pat. No. 10,158,720, filed on Dec. 18, 2018, PGR Trial No. PGR2019-00024, 111 pages.
Petition by Green Mountain Grills for Post Grant Review of U.S. Pat. No. 10,158,720, filed on Mar. 15, 2019, PGR Trial No. PGR2019-00036, 110 pages.
Petitioner's Reply to Patent Owners Preliminary Responce, PAPER 14, filed on May 17, 2019, by the petitioner, in the matter of *GMG Products LLC* v. *Traeger Pellet Grills, LLC, PGR* Trial No. PGR2019-00024 regarding U.S. Pat. No. 10,158,720, 07 pages.
Pew Research Center, U.S. Smartphone Use in 2015 at 36 (Apr. 1, 2015), 60 pages.
Post Grant Review Petition of U.S. Pat. No. 10,218,833, PAPER 3, filed on Feb. 26, 2019, by the petitioner, in the matter of *GMG*

(56) References Cited

OTHER PUBLICATIONS

Products LLC v. Traeger Pellet Grills, LLC, PGR Trial No. PGR2019-00034 regarding U.S. Pat. No. 10,218,833, 109 pages.
Procecution History for U.S. Pat. No. 10,158,720 (Part 1), Exhibits 2001, filed on Apr. 18, 2019, by the patent owner,in the matter of GMG Products LLC v. Traeger Pellet Grills, LLC, PGR Trial No. PGR2019-00024 regarding U.S. Pat. No. 10,158,720 ,350 pages.
Procecution History for U.S. Pat. No. 10,158,720 (Part 2), Exhibits 2001, filed on Apr. 18, 2019, in the matter of GMG Products LLC v. Traeger Pellet Grills, LLC, PGR Trial No. PGR2019-00024 regarding U.S. Pat. No. 10,158,720, by the patent owner, 435 pages.
"Char-Broil Operations Guide English French", 15.125115 VESCONN 2015 Grilling Guide ENG.indd, Jan. 19, 2016, pp. 1-20 (43 pages total).
"Interview with the developer of our WiFi controller." [online]. Posted Mar. 29, 2015. Retrieved Nov. 27, 2018. <https://web.archive.org/web/20150329163126/blog.greenmountaingrills.com/interview-david-developer-new-wifi-controller>, 3 pages.
"SmartChef Grill Guide English Spanish", 17.125395 Smart Chef Grill.indd, Sep. 27, 2016. pp. 1-16 (32 pages total).
U.S. Pat. No. 10,218,833 Patent File History, Dec. 21, 2018 RCE and IDS, Exhibits 1040, filed on Feb. 26, 2019, by the petitioner, 11 pages.
U.S. Pat. No. 10,218,833 Patent File History, Dec. 6, 2018 Issue Notification, EXHIBITS 1044, filed on Feb. 26, 2019, by the petitioner, 01 page.
U.S. Pat. No. 10,218,833 Patent File History, Jan. 14, 2019 Notice of Allowability, EXHIBITS 1041, filed on Feb. 26, 2019, by the petitioner, in the matter of GMG Products LLC v. Traeger Pellet Grills, LLC, PGR Trial No. PGR2019-00034 regarding U.S. Pat. No. 10,218,833, 2 pages.
U.S. Pat. No. 10,218,833 Patent File History, Jul. 18, 2018 Amendments, Exhibits 1037, in the matter of GMG Products LLC v. Traeger Pellet Grills, LLC, PGR Trial No. PGR2019-00034 regarding U.S. Pat. No. 10,218,833, filed on Feb. 26, 2019, by the petitioner, 11 pages.
U.S. Pat. No. 10,218,833 Patent File History, Mar. 13, 2017 Preliminary Amended Claims, Exhibits 1035, in the matter of GMG Products LLC v. Traeger Pellet Grills, LLC, PGR Trial No. PGR2019-00034 regarding U.S. Pat. No. 10,218,833, filed on Feb. 26, 2019, by the petitioner, 10 pages.
U.S. Pat. No. 10,218,833 Patent File History, May 11, 2018, Non-Final Rejection, Exhibits 1036, in the matter of GMG Products LLC v. Traeger Pellet Grills, LLC, PGR Trial No. PGR2019-00034 regarding U.S. Pat. No. 10,218,833, filed on Feb. 26, 2019, by the petitioner, 18 pages.
U.S. Pat. No. 10,218,833 Patent File History, Oct. 16, 2018 Response to Amendments Under Rule 312, Exhibits 1039, in the matter of GMG Products LLC v. Traeger Pellet Grills, LLC, PGR Trial No. PGR2019-00034 regarding U.S. Pat. No. 10,218,833, filed on Feb. 26, 2019, by the petitioner, 02 pages.
U.S. Pat. No. 10,218,833 Patent File History, Sep. 27, 2018 Amendments, Exhibits 1038, in the matter of GMG Products LLC v. Traeger Pellet Grills, LLC, PGR Trial No. PGR2019-00034 regarding U.S. Pat. No. 10,218,833, filed on Feb. 26, 2019, by the petitioner, 12 pages.
Affidavit of Christopher Butler, Internet Archives Affidavit (Feb. 8, 2019) 6 pages.
Anonymous:".: Learn How Green Mountain Grills Work :. Pellet Smokers and Grills", https://greenmountaingrills.com, Aug. 14, 2015 (Aug. 14, 2015), XP055670242, Retrieved from the Internet: URL:http://web.archive.org/web/20150814035439/https://greenmountaingrills.com/products/how-it-works/ [retrieved on Feb. 19, 2020].
Astrelgroup: "HOTTOH: Electronic solutions for the biomass heating". Mar. 15, 2016 (Mar. 15, 2016), pp. 1-36, Retrieved from the Internet: URL: http://www.astrelgroup.com/wp-content/uploads/2016/06/80H000011 R1.1 Hottoh-Catalogue EN 20160315.pdf [retrieved on Mar. 9, 2017].

Baum, White Paper, Texas Instruments, A Link to the Internet of Things: IoT made easy with SimpleLink Wi-Fi solutions, Jul. 14, pp. 7-11 (12 pages).
Bennett6. "Server Mode is Here". Pelletheads [online]. Posted on Jul. 4, 2016, 11:58:19 AM. [retrieved Sep. 11, 2018] Retrieved from Internet: <http://pelletheads.com/index.php?topic=37421.0>, 16 pages.
Bowie et al., "App User Guide Learn How To: Connect Your Grill to Your WiFi Create & Manage Food Profiles Control Your Grill Via Smart Phone Controls", Feb. 21, 2015, XP055670253, Retrieved from the Internet:URL:https://web.archive.org/web/20150221235940if_/http://greenmountaingrills.com/wp-content/uploads/2014/08/GMG-Singles-.pdf retrieved on Feb. 19, 2020.
Charles M. Kozierok, The TCP/IP Guide, The Advantages (Benefits) of Networking (vers. 3.0, Sep. 20, 2005) 3 pages.
Chef Tips: "Green Mountain Pellet Grill—Smoker Review & FAQ", YouTube, May 19, 2013 (May 19, 2013), pp. 1-1, XP054980243, Retrieved from the Internet: URL:https://www.youtube.com/watch?v-fh_4TInOHMw [retrieved on Feb. 19, 2020].
Craig Goldwyn, "The Zen of Wood" May 1, 2008, <www.amazingribs.com>, accessed online at <web.archive.org/web/20080501010952/http://www.amazingribs.com/tips_and_technique/zen_of_wood.html>.
Crock-Pot, Coming Soon! Crockpot(Registered) Smart Slow Cooker enabled with WeMo(Trademark) retrieved from http://www.crock-pot.com/slow-cookers/coming-soon%21-crock-pot%C2%AE-smart-slow-cooker-enabled-with-wemo%E2%84%A2/SCCPWM600-V1.html on Feb. 26, 2018, 8 pages.
Custom Thermoelectric, "Power Generator (Seebeck) Module Installation," 2010, pp. 1-6.
Dankirk. "Got My WiFi Upgrade". Pelletheads [online]. Posted on Aug. 22, 2014, 10:31:42 PM. [retrieved Sep. 11, 2018) Retrieved from Internet: <http://pelletheads.com/index.php?topic=30181.0>, 31 pages.
Daugherty, Trevor. 'With summer approaching, SABER introduces the iPhone connected EDGE smart grill', in 9TO5Toys [online]. Posted Mar. 16, 2015 [retrieved Jul. 6, 2018]. Retrieved from the Internet: <URL:https://9to5toys.com/2015/03/16/sbaer-edge-iphone-connected-grill/>, 12 pages.
Davy Crockett Model. Datasheet [online]. Green Mountain Grills LLC, May 28, 2015. [retrieved Sep. 11, 2018] Retrieved from Internet: <https://www.manualslib.com/manual/863329/Green-Mountain-Grills-Davy-Crockett.html>, 2 pages.
Declaration of Henry Houh, Ph.D., Exhibits 1002, filed on Dec. 18, 2018, by the petitioner, in the matter of GMG Products LLC v. Traeger Pellet Grills, LLC, PGR Trial No. PGR2019-00024 regarding U.S. Pat. No. 10,158,720, 149 pages.
Declaration of Henry Houh, Ph.D., Exhibits 1002, filed on Feb. 26, 2019, by the petitioner, in the matter of GMG Products LLC v. Traeger Pellet Grills, LLC, PGR Trial No. PGR2019-00034 regarding U.S. Pat. No. 10,218,833, dated Feb. 26, 2019, 159 pages.
Declaration of Henry Houh, Ph.D., Exhibits 1102, filed on Mar. 15, 2019, by the petitioner, in the matter of GMG Products LLC v. Traeger Pellet Grills, LLC, PGR Trial No. PGR2019-00036 regarding U.S. Pat. No. 10,158,720, 194 pages.
Don Clark, The Race to Build Command Centers for Smart Homes, Wall Street J. (Jan. 4, 2015) 3 pages.
Electric Imp Lockitron, retrieved from http://electricimo.com/productgallery/lockitron/ on Feb. 26, 2018, 2 pages.
Electric Imp Product, retrieved from http://electiicimp.com/product/ on Feb. 26, 2018, 3 pages.
Electric Imp, "Connectivity Made Simple" retrieved from http://electricimp.com/ on Feb. 26, 2018, 2 pages.
Electric Imp, "The Interactive imp: how to manage communication between app, agent and device" retrieved from http://electricimp.com/docs/resources/interactive/on Feb. 26, 2018, 11 pages.
Electric Imp, Inc. "specification: imp001 version 20140226" http://www.electricimp.com/ (2014) 14 pages.
Electric Imp. "How to run an imp offline: Making-and breaking-Internet connections" retrieved from http://eletricimp.com/docs/resources/offline/ on Feb. 26, 2018, 9 pages.
Emerson, Sensi Wi-Fi Programmable Thermostat Installation Guide (Sep. 2015) 13 pages.

(56) References Cited

OTHER PUBLICATIONS

Eugene Gorelik, Cloud Computing Models, MIT Working Paper, CISL #Jan. 2013 (Jan. 2013) 89 pages.
European Search Report and Search Opinion Received for EP Application No. 16857913.4, dated Mar. 26, 2019, 11 pages.
European Search Report and Search Opinion Received for EP Application No. 16857912.6, dated May 6, 2019, 6 pages.
European Search Report and Search Opinion Received for EP Application No. 16857921.7, dated Apr. 30, 2019, 10 pages.
European Search Report and Written Opinion from European Application No. 21184724.9, dated Aug. 17, 2021, 10 pages.
Examination Report from Great Britain Application No. 1800843, dated Feb. 19, 2021, 5 pages.
Facebook post entitled "Green Mountain Grills—Corporate shared a photo." 4 pages, posted on Jul. 29, 2014 by user "Green Mountain Grills—Corporate". [retrieved Sep. 11, 2018] Retrieved from Internet: <https://www.facebook.com/GreenMountainGrills/posts/826618620691226>.
Fielding et al., Standards Track: RFC 7230, Hypertext Transfer Protocol (HTTP/1.1): Message Syntax and Routing, Internet Engineering Task Force (IETF) (Jun. 2014) 89 pages.
File History for U.S. Pat. No. 10,158,720, Track One Request (Apr. 16, 2018), 2 pages.
File History for U.S. Pat. No. 10,218,833 Part 1, Exhibits 2001, in the matter of *GMG Products LLC* v. *Traeger Pellet Grills, LLC, PGR* Trial No. PGR2019-00024 regarding U.S. Pat. No. 10,158,720 filed on Jun. 5, 2019, by the patent owner, 363 pages.
File History for U.S. Pat. No. 10,218,833 Part 2, Exhibits 2001, in the matter of *GMG Products LLC* v. *Traeger Pellet Grills, LLC, PGR* Trial No. PGR2019-00024 regarding U.S. Pat. No. 10,158,720 filed on Jun. 5, 2019, by the patent owner, 541 pages.
File History for U.S. Pat. No. 10,158,720 Track One Grant (May 31, 2018), 4 pages.
Francis daCosta, Rethinking the Internet of Things: A Scalable Approach to Connecting Everything ch. 1 (2013) 185 pages.
Quirky Pivot Power Genius, retrieved from http://www.quirky.com/shop/633-pivot-power-genius-power-control-from-your-smartphone on Feb. 26, 2018, 6 pages.
Quirky Spotter, retrieved from http://www.quirky.com/shop/609-spotter-multi-prupose-sensor on Feb. 26, 2018, 4 pages.
Quirky, "Shop for products invented by real people" retireved from http://www.quirky.com on Feb. 26, 2018, 1 page.
RFC 791, Internet Protocol, DARPA Internet Program Protocol Specification (Sep. 1981) 50 pages.
Rus Shuler, White Paper, "How Does The Internet Work?" http://www.theshulers.com/whitepapers/internet_whitepaper/index.html#route (2005) 11 pages.
Screen Captures and Transcript from YouTube video dip entitled "Green Mountain Grills—First Ever AC/DC Powered—Davy Crockett Promo Video", 5 pages, uploaded on Jul. 31, 2014 by user "Green Mountain Grills", [retrieved Sep. 11, 2018) Retrieved from Internet: <https://www.youtube.com/watch?v=R5huHfS5cHA&list=RDQMGcmWL20hfzw&index=17>.
Screen Captures from YouTube video clip entitled "Network Setup on a Char-Broil Electric Smoker with Smartchef Technology", 5 pages, uploaded on Nov. 18, 2018 by user "Char-Broil Grills". Retrieved from Internet: <https://www.youtube.com/watch?v=bEt9_bLasas>.
Screen captures from YouTube video Clip entitled "Saber Edge Grill", 3 pages, uploaded on Apr. 5, 2015 by user "Max Good" Retrieved from Internet: <https://www.youtube.com/watch?v=mLZobNHMXbo>.
SmartThings GE Light & Appliance Plug-and-ControlPower Outlet, retireved from https://shop.smartthings.com#!/products/ge-z-wave-wireless-lighting-control-lamp-module on Feb. 26, 2018, 14 pages.
SmartThings Hub, retireved from https://shop.smartthings.com/#!/produds/smarthings-hub on Feb. 26, 2018, 16 pages.
SmartThings Product, retireved from http://www.smartthings.com/prduct/ on Feb. 26, 2018, 9 pages.
SmartThings, "Easy & Affordable Smart Home Automation" retireved from http://www.smartthings.com on Feb. 26, 2018, 5 pages.
Tasarra-Twigg, Noemi. 'The Saber EDGE Smart Grill: Hi-tech BBQ', in Apple Gazette [online]. Posted Mar. 17, 2015 [retrieved on Jul. 6, 2018]. Retrieved from the Internet: <URL:http//www.applegazette.com/accessories-2/the-saber-edge-smart-grill-hi-tech-bbq/>, 7 pages.
Texas Instruments, CC3200 SimpleLink Wi-Fi and Internet-of-Things Solution, a Single Chip Wireless MCU Programmer's Guide, Jul. 2013-Revised Jun. 2014, 68 pages.
Texas Instruments, CC3200 Software Development Kit (SDK), Service Pack, and Add-Ons, available at: https://www.ti.com/tool/download/CC3200SDK/1.1.0, Release Date: Feb. 24, 2015, 1 page.
Texas Instruments, SimpleLink Wi-Fi CC3200 LaunchPad Out of Box Experience Video, available at: https://training.ti.com/simplelink-wi-fi-cc3200- launchpad-out-box-experience, Nov. 8, 2015. Document includes one screenshot image from video.
The Statistics Portal, Cumulative Number of Apps Downloaded from the Apple App Store from Jul. 2008 to Jun. 2011 (in billions) (2019), 4 pages.
Ttdadmin, 'DADO & Partners Take Home Top Awards at Home Electronics Shows', in DADO [online]. Posted Mar. 16, 2015 [retrieved on Jul. 6, 2018]. Retrieved from the Internet: <URL:http://dadolabs.com/march2015awards/>, 4 pages.
Ttdadmin, 'Product Showcase: Char-Broil(Registered) Simple Smoker with SmartChef(Trademark) Technology', in DADO [online]. Posted Mar. 25, 2016 [retrieved on Jul. 6, 2018]. Retrieved from the Internet: <URL:http://dadolabs.com/charbroil-simple-smoker/>, 12 Pages.
Ttdadmin, 'Products', in DADO [online], [retrieved on Jul. 6, 2018] Retrieved from the Internet: <URL:http//dadolabs.com/category/products/>, 5 pages.
Ttdadmin, 'Saber, Char-Broil and DADO Make Outdoor Cooking Smart at CES', in DADO [online]. Posted Jan. 7, 2015 [retrieved on Jul. 6, 2018]. Retrieved from the Internet: <URL:http://dadolabs.com/saberandcbatces/>, 5 pages.
Ttdadmin, 'Smarter Cookouts With IoT-Enabled Grills', in DADO [online]. Posted May 7, 2015 [retrieved on Jul. 6, 2018] Retrieved from the Internet: <URL:http://dadolabs.com/smartercookoutswithiot/>, 5 pages.
U.S. Appl. No. 17/571,008, filed Jan. 7, 2022, titled "Routing Communications By Scanning Visible Codes", to Konicek et al., 66 pages.
Urban Griller. "GMG Server mode available". Smoke Fire and Food [online]. Posted on Jul. 6, 2016. [retrieved Sep. 11, 2018] Retrieved from Internet: <https://smokefireandfood.com/forum/index.php?thread/1632-gmg-server-mode-available/&s=91c16f3112ff4c847e243b766dee6abeb9553a5b>, 5 pages.
Welcome To Life Lived On the Edge, in Edge: A Smarter Barbecue [online]. Posted Sep. 8, 2015 [retrieved on Jul. 8, 2018]. Retrieved from the Internet <URL:https://www.sabergrills.com/Edge/features.html>, 4 pages.
Canadian Requisition by the Examiner for Canadian Application No. 2,969,476, dated May 4, 2022, 4 pages.
New Zealand Patent Examination Report No. 1 for New Zealand Application No. 739399, dated Feb. 8, 2022, 5 pages.
New Zealand Patent Examination Report No. 1 for New Zealand Application No. 774094, dated Mar. 18, 2022, 5 pages.
New Zealand Patent Examination Report No. 2 for New Zealand Application No. 774090, dated Oct. 4, 2022, 2 pages.
Japanese Notice of Reason for Rejection for Application No. 2022-015341 dated Feb. 21, 2023, 8 pages.

* cited by examiner

MOBILE APPLICATION FOR CONTROLLING OUTDOOR GRILL

CROSS-REFERENCE TO RELATED APPLICATIONS

This application is a continuation of U.S. patent application Ser. No. 16/947,366, filed Jul. 29, 2020, which is a continuation of U.S. patent application Ser. No. 16/432,798, filed Jun. 5, 2019, now U.S. Pat. No. 10,791,208, issued Sep. 29, 2020, which is a continuation-in-part of U.S. patent application Ser. No. 16/193,235, filed Nov. 16, 2018, now U.S. Pat. No. 10,951,751, issued Mar. 16, 2021, which is a continuation of U.S. patent application Ser. No. 15/510,996 entitled "MOBILE APPLICATION FOR CONTROLLING OUTDOOR GRILL," filed Mar. 13, 2017, now U.S. Pat. No. 10,218,833, issued Feb. 26, 2019, which application is a 35 U.S.C. § 371 U.S. National Stage of PCT Application No. PCT/US16/24737, filed on Mar. 29, 2016, which claims the benefit of priority to U.S. Provisional Application No. 62/245,535, filed Oct. 23, 2015, the disclosure of each of which is hereby incorporated herein in its entirety by this reference. U.S. Pat. No. 10,951,751 is also a continuation-in-part of U.S. patent application Ser. No. 15/114,744, filed Jul. 27, 2016, now U.S. Pat. No. 10,674,866, issued Jun. 9, 2020, which is a U.S. National Stage of PCT Application No. PCT/US16/39271, filed on Jun. 24, 2016, which claims the benefit of priority to U.S. Provisional Application No. 62/245,530, filed on Oct. 23, 2015. U.S. Pat. No. 10,951,751 is also a continuation-in-part of U.S. patent application Ser. No. 15/511,319, filed Mar. 15, 2017, now U.S. Pat. No. 10,455,022, issued Oct. 22, 2019 which is a U.S. National Stage of PCT Application No. PCT/US2016/26736, filed on Apr. 8, 2016, which claims the benefit of priority to the U.S. Provisional Application No. 62/245,549, filed Oct. 23, 2015. The entire content of each of the aforementioned patent applications is incorporated herein by reference.

TECHNICAL FIELD

Systems and methods for controlling operation of a smoker remotely.

BACKGROUND

Outdoor appliances have long been used to prepare food and perform other tasks. For example, outdoor appliances such as grills and smokers are often used to prepare meats, vegetables, fruits, and other types of food. These grills and smokers are typically operated using manual controls that are integrated into the frame of the grill or smoker. For example, many such outdoor appliances have an ignition button that, when pressed, generates a spark near a gas outlet on a burner. The spark ignites the gas and the burner begins to create heat. The amount of heat is generally controlled using a dial or nob that allows more or less gas to be introduced at the burner.

In some cases, the outdoor appliances may have electronic controls. Thus, instead of having a manual dial to adjust the amount of gas being introduced at the burner, an electrical control is set or adjusted by the user. The electrical control then interacts with a solenoid or other electro-mechanical component to regulate the flow of gas to the burner. Still, however, as is the case with manual dials and nobs, the user of the outdoor appliance has to be present at the grill to make changes to settings on the grill.

To overcome this problem, some newly-manufactured outdoor appliances have been equipped with BLUETOOTH® radios. These BLUETOOTH® radios allow communication with nearby electronic devices including cell phones or tablets of the appliance's owner. Range limitations to the BLUETOOTH® radio, however, necessitate that the user of the appliance still be within a certain proximity of the appliance. Once outside this proximity, the user no longer has any communication with the appliance, and thus cannot control any functionality related to the appliance. Moreover, even when connected to a mobile device, the appliance has very limited options as to what can be controlled over BLUETOOTH®. Indeed, the appliance has no access to any information or control signals beyond the user's mobile device.

BRIEF SUMMARY

Embodiments described herein are directed to controlling an electronically-controlled appliance using a software application and to providing a user interface for controlling an electronically-controlled appliance. In one embodiment, a computer system receives an indication from a remote computing system indicating that an electronically-controlled appliance is communicably connected to the remote computing system. The computer system provides a notification in the software application indicating that the electronically-controlled appliance is available to receive instructions, and receives a user input at the software application indicating that certain functions are to be performed by the electronically-controlled appliance.

The computer system further generates instructions configured to control the electronically-controlled appliance based on the functions specified in the received user input, and sends the generated instructions to the electronically-controlled appliance to perform the specified functions. These functions are then interpreted and carried out on the electronically-controlled appliance via the hardware controller.

In another embodiment, a computer system provides a user interface for controlling an electronically-controlled appliance. The user interface (UI) includes the following: a first input field configured to receive input indicating whether an electronically-controlled appliance is permitted to communicate with remote computing systems, a notification field configured to indicate whether the electronically-controlled appliance is communicably connected to the remote computing systems, and to further provide notifications indicating that the electronically-controlled appliance is available to receive instructions, and a second input field configured to receive input indicating that specified functions are to be performed by the electronically-controlled appliance.

The UI further includes an instruction generating indicator configured to indicate that instructions configured to control the electronically-controlled appliance are being generated based on the functions specified in the received user input, and a transmission indicator configured to indicate that the instructions are being sent to the electronically-controlled appliance for performance of the specified functions, where the functions are interpreted and carried out by a hardware controller on the electronically-controlled appliance.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings which are briefly described below.

DETAILED DESCRIPTION

Figure 1A:
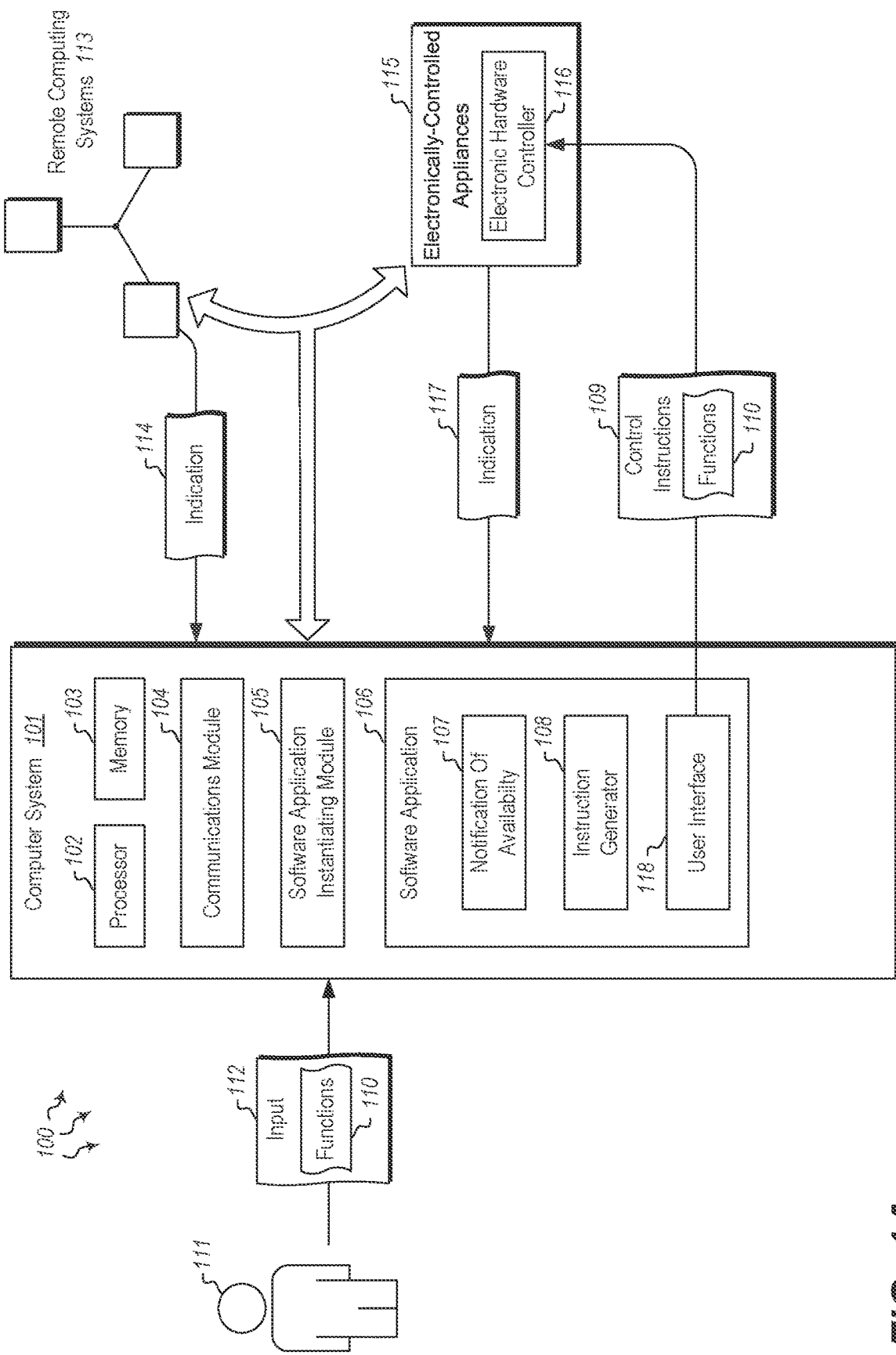
FIG. 1A illustrates a computer architecture in which embodiments described herein may operate including controlling an electronically-controlled appliance using a software application and providing a user interface for controlling an electronically-controlled appliance.

Embodiments described herein are directed to controlling an electronically-controlled appliance using a software application and to providing a user interface for controlling an electronically-controlled appliance. In one embodiment, a computer system receives an indication from a remote computing system indicating that an electronically-controlled appliance is communicably connected to the remote computing system. The computer system provides a notification in the software application indicating that the electronically-controlled appliance is available to receive instructions, and receives a user input at the software application indicating that certain functions are to be performed by the electronically-controlled appliance.

The computer system further generates instructions configured to control the electronically-controlled appliance based on the functions specified in the received user input, and sends the generated instructions to the electronically-controlled appliance to perform the specified functions. These functions are then interpreted and carried out on the electronically-controlled appliance via the hardware controller.

In another embodiment, a computer system provides a user interface for controlling an electronically-controlled appliance. The user interface (UI) includes the following: a first input field configured to receive input indicating whether an electronically-controlled appliance is permitted to communicate with remote computing systems, a notification field configured to indicate whether the electronically-controlled appliance is communicably connected to the remote computing systems, and to further provide notifications indicating that the electronically-controlled appliance is available to receive instructions, and a second input field configured to receive input indicating that specified functions are to be performed by the electronically-controlled appliance.

Embodiments described herein may implement various types of computing systems. These computing systems are now increasingly taking a wide variety of forms. Computing systems may, for example, be mobile phones, electronic appliances, laptop computers, tablet computers, wearable devices, desktop computers, mainframes, and the like. As used herein, the term "computing system" includes any device, system, or combination thereof that includes at least one processor, and a physical and tangible computer-readable memory capable of having thereon computer-executable instructions that are executable by the processor. A computing system may be distributed over a network environment and may include multiple constituent computing systems.

A computing system typically includes at least one processing unit and memory. The memory may be physical system memory, which may be volatile, non-volatile, or some combination of the two. The term "memory" may also be used herein to refer to non-volatile mass storage such as physical storage media or physical storage devices. If the computing system is distributed, the processing, memory and/or storage capability may be distributed as well.

As used herein, the term "executable module" or "executable component" can refer to software objects, routines, methods, or similar computer-executable instructions that may be executed on the computing system. The different components, modules, engines, and services described herein may be implemented as objects or processes that execute on the computing system (e.g., as separate threads). As described herein, a computing system may also contain communication channels that allow the computing system to communicate with other message processors over a wired or wireless network. Such communication channels may include hardware-based receivers, transmitters or transceivers, which are configured to receive data, transmit data or perform both.

Embodiments described herein also include physical computer-readable media for carrying or storing computer-executable instructions and/or data structures. Such computer-readable media can be any available physical media that can be accessed by a general-purpose or special-purpose computing system.

Computer storage media are physical hardware storage media that store computer-executable instructions and/or data structures. Physical hardware storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computing system to implement the disclosed functionality of the embodiments described herein. The data structures may include primitive types (e.g., character, double, floating-point), composite types (e.g., array, record, union, etc.), abstract data types (e.g., container, list, set, stack, tree, etc.), hashes, graphs or any other types of data structures.

As used herein, computer-executable instructions comprise instructions and data which, when executed at one or more processors, cause a general-purpose computing system, special-purpose computing system, or special-purpose processing device to perform a certain function or group of functions. Computer-executable instructions may be, for example, binaries, intermediate format instructions such as assembly language, or even source code.

Those skilled in the art will appreciate that the principles described herein may be practiced in network computing environments with many types of computing system configurations, including, personal computers, desktop computers, laptop computers, message processors, hand-held devices, multi-processor systems, microprocessor-based or programmable consumer electronics, network PCs, mini-computers, mainframe computers, mobile telephones, PDAs, tablets, pagers, routers, switches, and the like. The embodiments herein may also be practiced in distributed system environments where local and remote computing systems, which are linked (either by hardwired data links, wireless data links, or by a combination of hardwired and wireless data links) through a network, both perform tasks. As such, in a distributed system environment, a computing system may include a plurality of constituent computing systems. In a distributed system environment, program modules may be located in both local and remote memory storage devices.

Those skilled in the art will also appreciate that the embodiments herein may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or removed without impacting the core system.

Referring to the figures, FIG. 1A illustrates an environment 100 in which at least one embodiment described herein may be employed. The environment 100 includes a computer system 101. The computer system 101 may be any type of local or distributed computer system, including a cloud computer system. The computer system 101 includes a hardware processor 102 and physical system memory 103. The computer system 101 further includes modules for performing a variety of different functions.

For instance, the communications module 104 may be configured to communicate with other computing systems (e.g., remote computing systems 113). The communications module 104 may include any wired or wireless communication means that can receive and/or transmit data to or from other computing systems such as wired or wireless network interface cards. The communications module 104 may be configured to interact with databases, mobile computing devices (such as mobile phones or tablets), electronically-controlled appliances (e.g., 115), embedded computing systems or other types of computing systems.

Indeed, in one embodiment, the computer system 101 may be a mobile computer system, and may be configured to communicate with remote computing systems 113 (e.g., cloud computing systems) and/or with electronically-controlled appliance 115. The remote computing systems 113 may also be able to communicate with the electronically-controlled appliance 115, either directly or through the (mobile) computer system 101. The electronically-controlled appliance 115 may be any type of appliance or device that is electronically-controlled. For example, any device that is controlled by an electronic hardware controller 116 would be an electronically-controlled appliance 115. The electronic hardware controller 116 may include computer memory that has instructions stored thereon for controlling the appliance or device.

In one example embodiment, the electronically-controlled appliance 115 is a grill or smoking appliance, although the embodiments described herein are not limited to such. The grill/smoker may be operated by the electronic hardware controller 116. The controller 116 may be configured to control temperature, control cooking cycles, control fuel burn rate, monitor ambient temperature, or perform other functions. In some cases, the electronic hardware controller 116 may include or be communicatively connected to a radio such as a BLUETOOTH® or Wi-Fi radio that can wirelessly communicate with other computing systems (e.g., 101 and 113). The electronic hardware controller 116 may control these communications, and may present a display 125b to a user. The display 125b may include a variety of information, including a graphical user interface (GUI) that allows interaction from an appliance user.

The computer system 101 may be configured to interact with the electronically-controlled appliance 115 through the communications module 104. The computer system 101 further includes a software application instantiating module 105 that instantiates software application 106 on the computer system. The software application 106 may include a GUI for controlling the electronically-controlled appliance 115. The GUI may provide various notifications, alerts, buttons, fields, prompts or other elements that allow monitoring and control of the electronically-controlled appliance 115.

In one embodiment, the software application 106 provides a notification of availability 107. The notification of availability 107 may indicate that the electronically-controlled appliance 115 is available to receive control instructions. These control instructions 109 may include, for example, an indication that a certain amount of fuel pellets is to be added to a smoker's combustion area, or that a specified amount of fuel (such as propane) is to be burned by a grill, or that a specified internal temperature is to be reached and maintained. The notification of availability 107 may indicate whether the electronically-controlled appliance 115 is available or not to receive such control instructions 109.

If the notification of availability 107 indicates that the electronically-controlled appliance 115 is currently available to receive instructions, the user interface 118 may be displayed so that a user 111 may provide input 112, indicating how the user wants to control the appliance. The user interface 118 may provide many different functions 110 that are controllable using the user interface. As mentioned above, these functions 110 may include substantially any function that the electronically-controlled appliance 115 is capable of (or is modified to be capable of) performing. For grill and smokers, this may include controlling burn rate, temperature, cooking cycle, fuel dispensing, controlling timers, accessing recipes, displaying probe temperatures or alerts, turning the device on or off, or other functions.

Other electronically-controlled appliances 115 such as ovens, refrigerators, blenders, toasters, dishwashers, coffee machines, mixers, bread makers, washers and dryers or other appliances may also be controlled using the software application 106 in a manner that is the same as or similar to that used to control a grill or smoker. The software application 106 may provide a notification of availability for the appliance, and the application may display a user interface for controlling functions of that appliance. As the input 112 are received from the user 111, the instruction generator 108 may generate instructions that are specific to that device, and that are interpretable and understandable by the electronically-controlled appliance 115. These control instructions 109 are then sent to the electronically-controlled appliance 115 to control the functions 110 specified by the user 111.

In some cases, a user may control whether the electronically-controlled appliance 115 is permitted to communicate with other computing systems such as remote computing systems 113. The electronically-controlled appliance 115 may send an indication 117 to the (mobile) computer system 101, indicating that it wishes to communicate with one or more remote computing systems 113 (for example, to download a recipe). The user 111 may provide input 112 indicating whether the electronically-controlled appliance 115 is permitted to communicate with the remote computing systems 113 or not. If such communication is permitted by the user, the electronically-controlled appliance 115 may communicate with an access point (such as a router) that permits flow of data between the electronically-controlled appliance 115 and the remote computing systems 113.

Figure 1B:
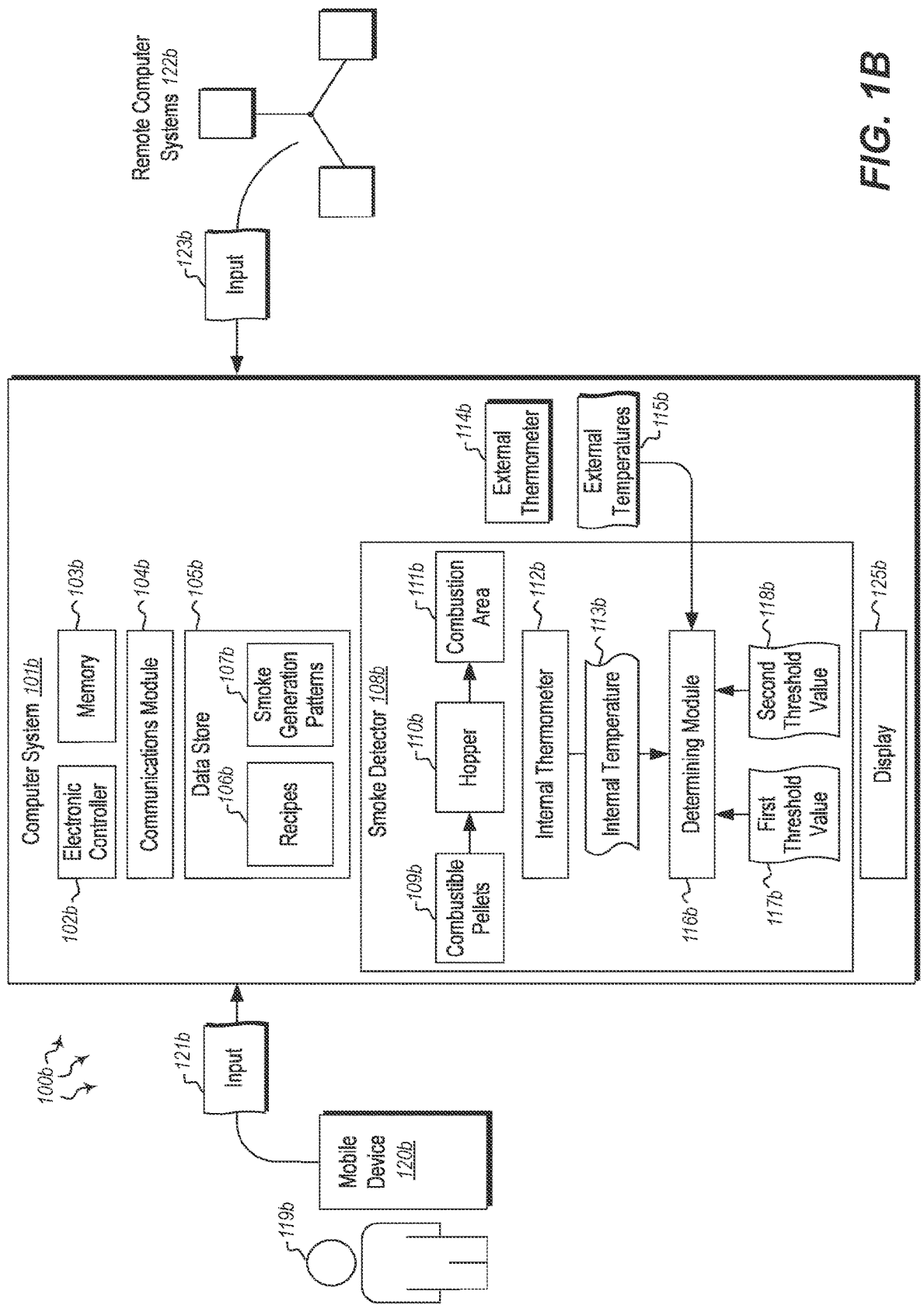
FIG. 1B illustrates a computer architecture in which embodiments described herein may operate including smoking food in an outdoor grill using a customized smoking routine.

FIG. 1B illustrates an environment 100b in which at least one embodiment described herein may be employed. The environment 100b includes an outdoor grill 101b. For example, the outdoor grill 101b may comprise an electronically-controlled appliance 115, as described above in regard to FIG. 1A. As used herein, the term "outdoor grill" means outdoor cooking apparatus, including barbecue grills, smokers, and/or barbecue smokers. Barbecue smokers, in turn, refers to outdoor cooking apparatus that are configured to cook food at least in part through generated smoke, such as smoke generated through wood combustion. Accordingly, the outdoor grill 101b illustrated or otherwise described herein may be any type of cooking appliance including a conventional barbecue grill, smoker or other device.

In general, the outdoor grill 101b includes hardware and other modules for performing a variety of different functions. For instance, the outdoor grill 101b includes an electronic controller 102b. The electronic controller may be any type of microcontroller, microprocessor, or other processing means capable of processing software code. The software code may be stored on computer-readable media including memory 103b or other data storage 105b. The data storage may be flash or other non-volatile memory. As such, the outdoor grill 101b may have sufficient processing power and memory to be considered a computing system, or at least as having an attached computing system.

FIG. 1B further shows that the outdoor grill 101b can include a communications module 104b. The communications module 104b may be configured to communicate with other computing systems such as mobile device 120b used by user 119b, or remote computer systems 122b. As understood herein, a "mobile device" (120b) means any computing system (including but not limited to a smart phone) that enables a user to provide remote inputs, selections, and other controls that are communicated with outdoor grill 101b from a remote location. The communication between mobile device and outdoor grill 101b can occur over a network comprising a combination of wireless and hardwired connections. For example, mobile device 120b may be wirelessly connected to a network, or may be connected to the network over a network cable, such as a cable employing an Ethernet, USB, or other appropriate connection interface.

Thus, mobile device 120b can comprise a mobile phone, a tablet device, or may comprise another form of a remote control display, such as a digital remote control, including a network-enabled tablet-style touch screen having a graphical user interface displayed thereon. In one implementation, for example, mobile device 120b comprises an LCD screen having one or more controls (e.g., touch screen controls or physical push-button controls) that are used primarily within an indoor environment, and in any event remote from the outdoor grill 101b.

For example, the mobile device 120b may comprise a remote screen that is positioned or mounted on or about a kitchen countertop, but is nevertheless connected over a network (BLUETOOTH®, Wi-Fi, or network cable) to outdoor grill 101b and/or remote computer systems 122b over a network. Specifically, the communications module 104b may include any wired or wireless communication means that can receive and/or transmit data to or from other computing systems. The communications module 104b may be configured to interact with databases, mobile computing devices (such as mobile phones or tablets), embedded or other types of computing systems. In some cases, the mobile device 120b and/or the remote computer systems 122b may be configured to provide inputs to the outdoor grill 101b. For instance, the mobile device 120b may provide input 121b to the outdoor grill 101b, such as by providing a "cooking profile" for a food item. This input may specify a recipe that is to be used, which in turn may specify a custom smoking pattern (or other temperature or flavor profile pattern involving operation of multiple components on outdoor grill 101b) that is to be used when preparing a certain portion of food. These recipes 106b and custom smoke generation patterns may be stored in data store 105b and accessed by the electronic controller 102b.

The remote computer systems 122b may also provide inputs 123b to the outdoor grill 101b. These inputs may likewise be recipes or custom grilling or smoking pattern controls, including fan (on/off, speed or RPM) and/or hopper/auger adjustments, but may also be advertisements or other data pertinent to the grill owner. For example, as will be explained further below, the remote computer systems 122*b* may provide remote diagnostics or analytic information to the grill owner, displayable on a grill 101*b* display.

FIG. 1B further shows that the outdoor grill 101*b* includes a smoke generator 108*b*. In at least one embodiment, the smoke generator 108*b* includes hardware including a hopper 110*b* for loading combustible pellets 109*b* into the combustion area 111*b*. In some embodiments, the outdoor grill 101*b* may be a smoker that is fueled by combustible pellets 109*b* (such as wood pellets, or other appropriate combustion precursor). The hopper 110*b* may supply the fuel to the combustion area 111*b* at a specified rate so as to maintain a specific internal temperature 113*b*. The internal temperature may be measured by an internal thermometer 112*b* that is inside grill 101*b*. The determining module 116*b* of the smoke generator 108*b* may, for example, determine that the current internal temperature 113*b* is too low, and may cause the hopper 110*b* to load more pellets/fuel 109 into the combustion area 111*b*, and/or to adjust a fan or other components to help increase temperature. Conversely, if the internal temperature is too high, the loading of pellets/fuel into the combustion area 111*b* may be halted for a time until the temperature has cooled, and similarly to adjust a fan up/down or on/off to assist in cooling.

At least in some embodiments, the outdoor grill 101*b* may be controlled by user 119*b* via the mobile device 120*b*. The mobile device 120*b* may be configured to run an application that allows the user 119*b* to control functionality of the outdoor grill 101*b*. Using the software application, for example, the user 119*b* may cause the outdoor grill 101*b* to ignite and begin a specified "cooking profile" assigned to the food item, such as a recipe employing a particular smoking pattern geared toward a particular end result in the food item. For instance, the user 119*b* may direct use of a particular cooking profile for a food item by selecting one of the stored recipes 106*b* or smoke generation patterns 107*b* stored on the grill's data store 105*b*, wherein the selected recipes 106*b* comprise one or more flavor, smoke, temperature or other cooking profile features for a particular food item.

Thus, the "cooking profile" in at least one embodiment comprises a set of values contained in one or more files associated with a food item, such as files contained in a downloadable recipe (from remote computer systems 122*b*), which are intended to produce a particular end result in the food item. For example, a cooking profile for a particular type of beef may include specifications that the final product be "medium rare," or reddish pink in terms of internal color, and/or may specify an internal temperature for the food item, such as 135° F. (57° C.). The cooking profile may alternatively indicate that the meat needs to be tender enough to shred, or contain a certain amount of smoke flavor in the meat.

Each of these end results may be driven in part by a downloaded recipe, or by manual inputs by a user at grill 101*b* or via mobile device 120*b*. The recipe may include such values as cooking time, amount of smoke applied and when, internal grill temperature, and so on. The cooking profile, in at least one implementation, may be used to adjust certain recipe steps in accordance with other variables that occur during a cooking cycle to ensure the overall end result. In general, therefore, a cooking profile can be understood as overall characteristics of a food item based on an intended end result for the particular food item, whereas a "recipe" refers to the generally modifiable steps used to achieve the end result.

Accordingly, embodiments of the present invention provide a grill system that enables the user to automatically control various aspects of a cooking process for different performance levels. In particular, embodiments of the present invention enable a user to automatically or manually monitor and adjust a grill temperature, to change or start a timer, to adjust a smoking pattern, to set the grill to a "keep warm," or to adjust other state, or to perform other controls specifically geared toward a particular flavor or other desired end result.

Embodiments of the present invention allow the user to be as involved or uninvolved as desired, and to handle grilling procedures from a remote location. In particular, embodiments of the present invention enable a user to have part or full control over cooking a food item, and thus operation of multiple components of the outdoor grill in general accordance with multiple user preferences to whatever extent the user desires to be involved in controlling the operation or outcome, and regardless whether the user is away on travel, or at home in a living room.

Figure 2:
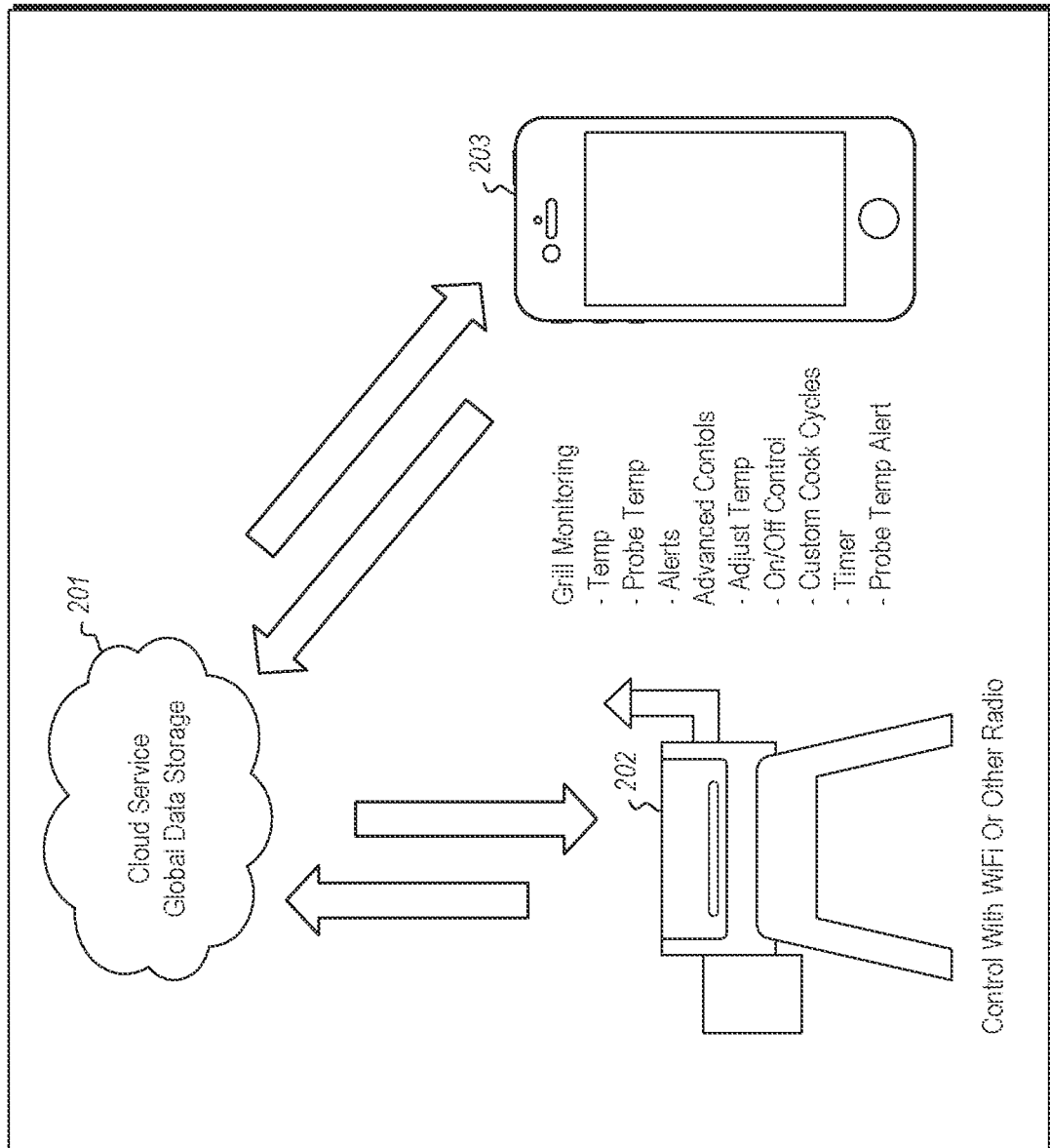
FIG. 2 illustrates an embodiment in which an electronically-controlled appliance is in communication with a cloud service and a mobile electronic device.

FIG. 2 illustrates an embodiment in which a smoker 202 is controlled via a smart phone 203 (or rather via a software application running on the smart phone). The smart phone 203 may communicate with a cloud service 201 which, in turn, communicates with the smoker 202. The cloud service 201 may provide data storage along with other features. The data storage may store, for example, recipes used by the smoker 202 to smoke meats, vegetables, fruits or other food items. Using the cloud service 201, a customer or user may use their smart phone 203, tablet, laptop, desktop or other computer system to control the functions of the smoker 202.

The functionality may include smoker/grill monitoring including monitoring of the internal temperature, external ambient air temperature, probe temperature (e.g., from probes that communicate wirelessly), and alerts that may be raised by the grill or smoker. Other controls may include adjusting the temperature by adding more fuel, or allowing the existing fuel (such as pellets) to burn down so as to reduce the temperature, turning the device on or off or turning certain components on or off, controlling the timer or custom cooking cycles, or monitoring probe temperature alerts. Many more controls may be provided on the smart phone 203, and the amount and type of controls may be updated over time to add new functionality.

As control inputs are received at the smart phone 203 (or other electronic device), they are passed to the cloud service 201 via a wired or wireless data transmission. The control inputs are then passed to the smoker 202 directly or via an access point such as a Wi-Fi router. In this manner, a user may be able to control their smoker/grill from substantially any location that has internet access. In some cases, the user may even be able to ignite the smoker 202 remotely, while in other cases, such functionality may be disabled unless the user is within a specified distance of the grill, as determined by a GPS or BLUETOOTH® geofence.

Figure 3:
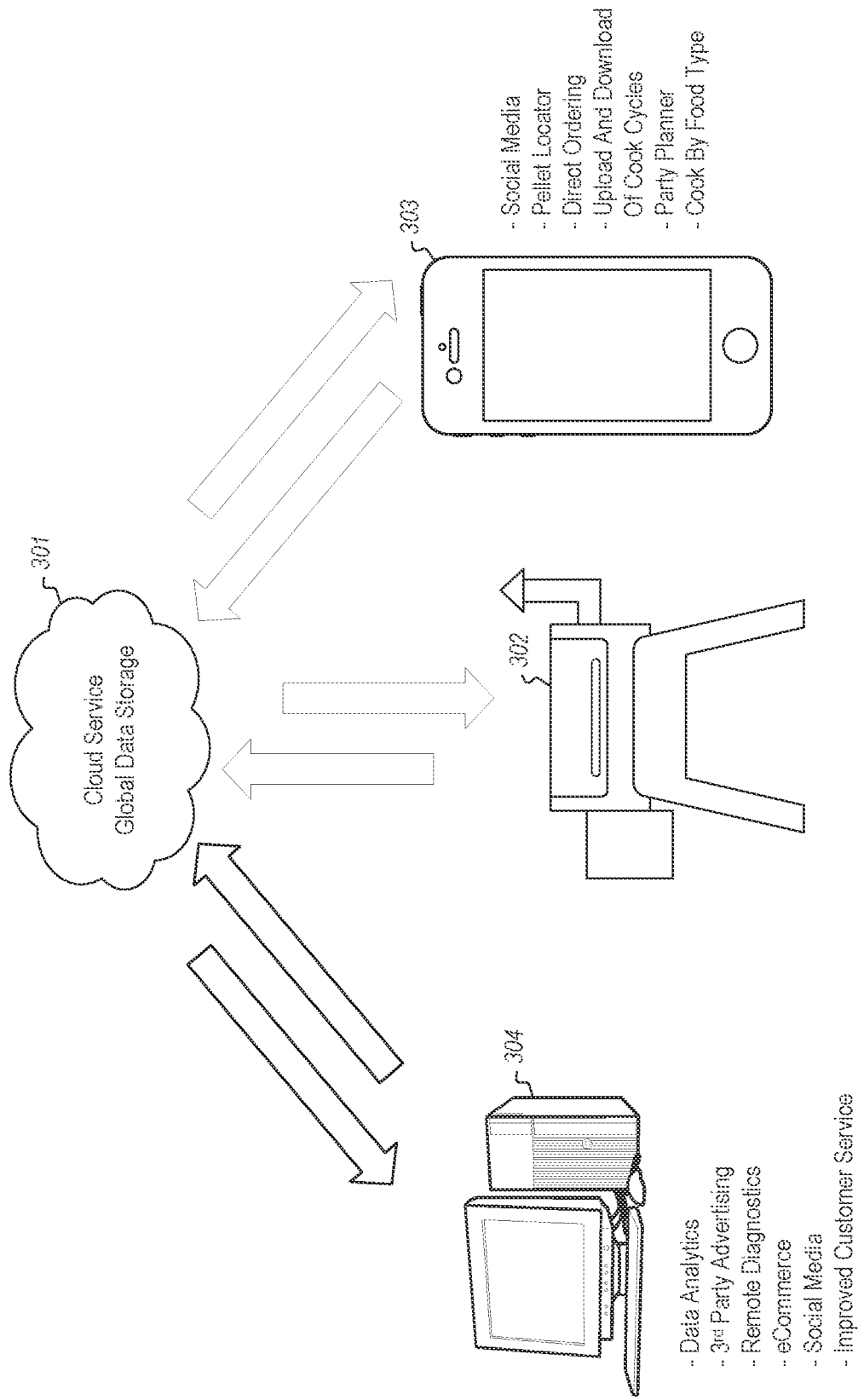
FIG. 3 illustrates an embodiment in which an electronically-controlled appliance is in communication with a cloud service and a mobile electronic device, and is further in communication with analytics, social media or other third party systems.

FIG. 3 illustrates an environment similar to that of FIG. 2 in which a cloud service 301 links various devices including a smoker/grill 302 and a smart phone 303 or other electronic computing device 304. The cloud service 301 is also connected to various other services and systems including, but not limited to, data analytics, third party advertising, remote diagnostic services, eCommerce services, social media, customer service assistance and others. For example, usage data for the smoker/grill 302 may be uploaded to the cloud service 301 and stored in the global data storage.

This usage data (such as when the smoker was turned on, how long was it turned on, what temperature did it reach, what was the average internal temperature, what was the average external temperature, what cooking/smoking recipe was used, what controls were used and when or other operational usage data) may be analyzed by an analytics engine in combination with data from other users. As such, usage data from many different users may be logged and analyzed to identify broad patterns of use. These analytics may then be used to refine and improve future smokers or grills, or may be used for other purposes such as providing advertising.

In one example, the cloud service may track users' usage of the smoker/grill and may determine which products or recipes may be of interest to a given user based on similarities between their usage of the grill and other's usage. The usage data may also be used to perform remote diagnostics of the smoker/grill 302. For instance, the usage data may indicate that a user's grill temperature exceeded a normal operating temperature (e.g., due to a grease fire). As such, certain parts may have failed or may be likely to fail due to the extreme heat. Other usage data may indicate different problems that may be likely to occur as a result of how the user is using their grill. Usage data may also be sent to social media announcing successful implementation of a recipe, or announcing to party guests that a specified meat is smoking and will be ready at a certain time. Many other social media implementations may also be used as provided by the cloud service 301.

Figure 4:
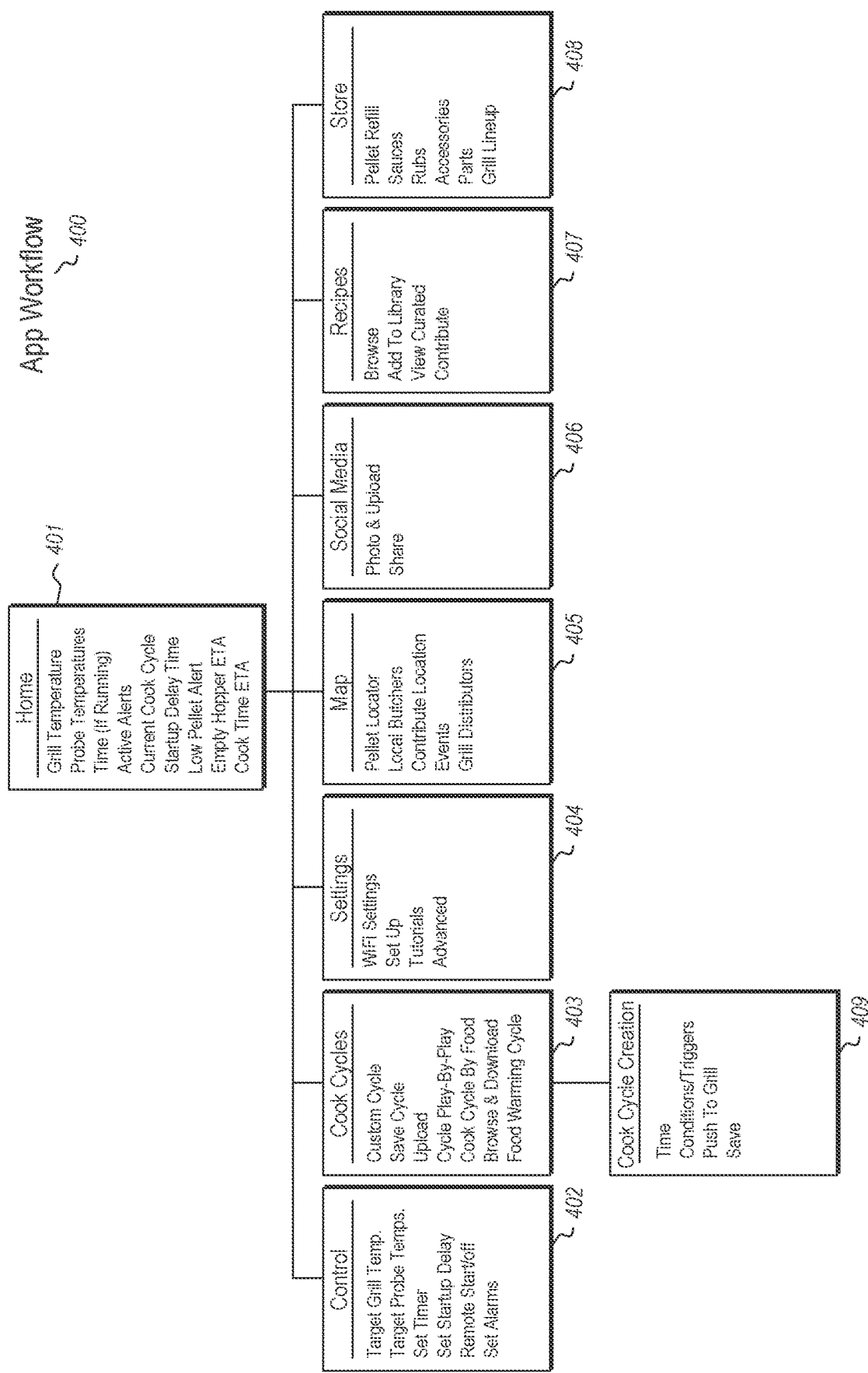
FIG. 4 illustrates an embodiment of a software application functionality hierarchy.

FIG. 4 illustrates an application workflow 400 for a software application such as software application 106 of FIG. 1. The application may run on a mobile device such as a phone or tablet or wearable device, or may be run on a desktop computing system or may be run through a web browser. It will be understood that the application workflow 400 is one example of an application workflow, and other embodiments and implementations are possible.

The application workflow 400 includes a home menu 401 that, on launch, shows the status of the grill (or other electronically-controlled appliance), the status of any probes in use, the status of any timers in use and any alerts. A first-time setup may walk a user through connecting the grill to an access point (such as a Wi-Fi access point), and linking the mobile device to the grill. The first-time setup may also take the user through a tutorial on how to use the grill, or at least certain components of the grill. The home menu 401 may show any or all of the following: grill temperature, probe temperature, timer (if running), active alerts (e.g., a low pellet alert or an empty hopper alert), current cook cycle, current cook time-to-completion, startup delay time, or other information.

The application may have many different tabs and menus, including one or more of the following: a control menu 402 that allows users to control the grill's target temperature, control the grill's target probe temperatures, set or restart timers, set startup delays, remotely start or turn grill off, set alerts or perform other functionality. A cook cycles menu 403 may be provided which allows users to select from different cooking cycles (i.e., pre-programmed cooking routines that control temperature for a specified amount of time to cook or smoke the food item in a certain manner), save cooking cycles, upload cooking cycles to a cloud service (e.g., 301 of FIG. 3), provide the user a play-by-play indicator of what is occurring during a cooking cycle, implement a certain cook cycle for a given food, browse and download recipes and/or cook cycles, provide access to a food warming cycle that keeps the food at a certain temperature for a specified time, or perform other functions.

The cook cycles menu 403 may have one or more submenus including a cook cycle creation menu 409. The cook cycle creation menu 409 may allow a user to create his or her own custom cooking cycle. The custom cooking cycle can specify a given time to begin and end, a certain temperature to hold or change to throughout the cycle, various customizable triggers or conditions that may cause changes to the cooking cycle such as shortening or lengthening the cooking time, or increasing or decreasing internal grill temperature for a given length of time. The cook cycle creation menu 409 may allow a user to push the customized cooking cycle to the grill and have the grill begin implementation of the cycle. This customized cooking cycle may also be saved directly on the grill or in the cloud service 301.

Other menus provided on the application workflow may include a settings menu 404. The settings menu may allow a user to set up Wi-Fi, BLUETOOTH® or communication means on the grill. The settings menu 404 may also allow configuration settings to be accessed and changed. The settings menu 404 may further provide tutorial as well as other appliance- or application-specific settings that may be changed using the settings menu. A map menu 405 or tab may be provided which gives access to local retailers including pellet sellers or distributors, local butchers or farms for meat or vegetables, local events including barbeques or tailgate parties, or locations of nearby grill distributors. The map menu 405 may also provide other information that is specific to the appliance, such as a repair shop that specializes in repairs for that appliance.

A social media menu 406 may be provided which allows users to upload photos, recipes, videos or other media which may be of interest to other users. The social media tab may allow the user to post images or status updates to social media websites, including location pins, updates from the grill itself or other information. As such, the social media menu 406 allows users to share their grilling/smoking experience with others.

A recipes menu 407 allows users to browse recipes available online or through the cloud service 301. When browsing these recipes, the user may select to download the recipes to their phone or other device. These recipes can be collected in a library and shared via social media. Users can sort the recipes, add their own recipes, add pictures to others' recipes or otherwise interact with the recipe database. A store menu 408 allows a user to purchase pellets, propane or other fuel, purchase sauces, rubs, grill accessories, grill parts or full grills/smokers. The store may be expanded to allow the purchase of food items or other items that may be used in conjunction with the grill. The concepts described above will be explained further below with regard to method 500 of FIG. 5.

Figure 5:
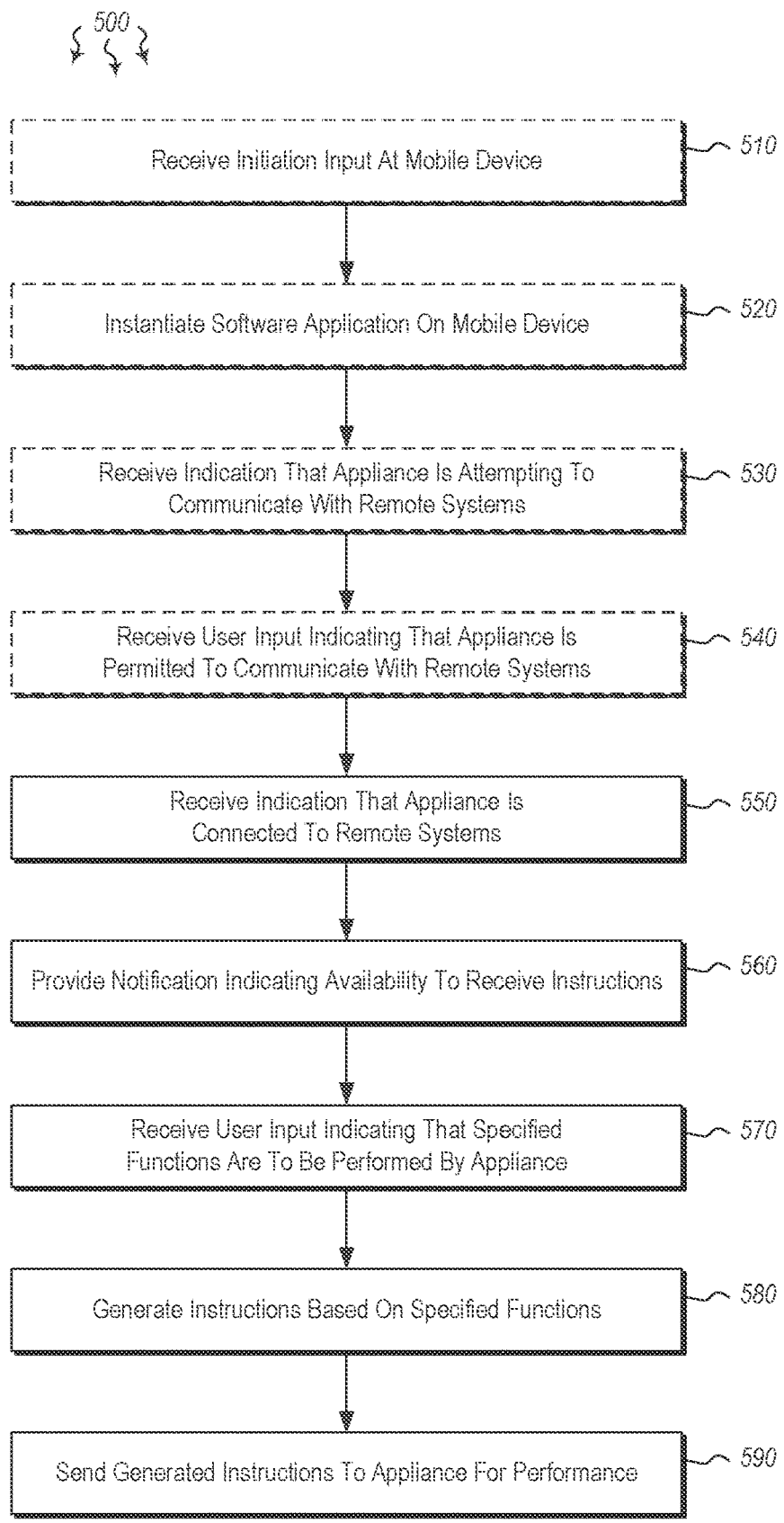
FIG. 5 illustrates a flowchart of an example method for controlling an electronically-controlled appliance using a software application.

In view of the systems and architectures described above, methodologies that may be implemented in accordance with the disclosed subject matter will be better appreciated with reference to the flow chart of FIG. 5. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 5 illustrates a flowchart of a method 500 for controlling an electronically-controlled appliance using a software application. The method 500 will now be described with frequent reference to the components and data of environment 100 of FIG. 1.

In some embodiments, method 500 may begin with the act of receiving an initiation input that indicates that the software application is to be instantiated on a mobile device (510) and instantiating the software application on the mobile device (520). For example, a user 111 may provide input 112 at the (mobile) computer system 101 indicating that software application 106 is to be instantiated. The software application may be implemented to control functionality of the electronically-controlled appliance 115. Once such an input is received, the computer system 101 may instantiate the software application, making it available for use by the user 111.

Method 500 may further include receiving an indication at the software application indicating that the electronically-controlled appliance is attempting to communicate with one or more remote computing systems (530) and further receiving a user input at the software application indicating that the electronically-controlled appliance is permitted to communicate with the one or more remote computing systems (540). For instance, computer system 101 may receive indication 114 from remote computing systems 113 (e.g., from a cloud service) indicating that the electronically-controlled appliance 115 is attempting to communicate with them. The communication attempt may be for the purposes of downloading a recipe, for example. The software application 106 may provide a notification to the user indicating that the electronically-controlled appliance 115 is attempting communication with the remote computing systems 113. The user 111 may then indicate whether such communication is permissible or not.

If so, then the electronically-controlled appliance, which is communicably connected to the remote computing systems 113 via a wired or wireless connection (such as through an access point) may begin communication with the remote computing systems. This permission may be valid for a given session, for a given period of time, or for a given purpose (e.g., downloading a recipe). Method 500 next includes receiving an indication from one or more remote computing systems indicating that the electronically-controlled appliance is communicably connected to the one or more remote computing systems (550).

One or more of the remote computing systems 113 may send an indication 114 to the computer system 101 indicating that the electronically-controlled appliance 115 communicably connected to the remote systems, after which the software application 106 may provide a notification of availability 107 indicating that the electronically-controlled appliance is available to receive instructions (560). In some cases, the notification of availability 107 may be color-coded to indicate at a glance whether the electronically-controlled appliance 115 is available to receive instructions. For instance, if it is available, the notification of availability 107 may be illustrated in green, while if the electronically-controlled appliance 115 is not available, the notification of availability 107 may be illustrated in red or in some other manner that clearly indicates the communication status.

Method 500 further includes receiving a user input at the software application indicating that one or more specified functions are to be performed by the electronically-controlled appliance (570). For example, user 111 may provide user input 112 that specifies various functions 110 that are to be performed by the electronically-controlled appliance 115. The inputs may specify new instructions to the electronically-controlled appliance 115, or changes to existing instructions.

The user's input 112 may cause the instruction generator 108 of the software application 106 to generate one or more control instructions 109 configured to control the electronically-controlled appliance based on the functions 110 specified in the received user input (580). These control instructions 109 are then sent to the electronically-controlled appliance 115 to perform the functions. The electronic hardware controller 116 of the electronically-controlled appliance 115 then interprets and carries out the specified functions (590).

The software application 106 may be configured to display a user interface 118 that prompts the user 111 to provide demographic information such as name, age, address, gender, grilling preferences, grill serial number and/or other similar information. This demographic information may then be sent to a cloud platform (e.g., cloud service 301 of FIG. 3) configured to register the electronically-controlled appliance to an account associated with the user. The account may store the user's information, appliances that are registered to the account, recipes associated with the user (e.g., recipes the user has uploaded, downloaded or "liked"), or other information associated with the user.

The software application 106 may be configured to receive information from the one or more remote computing systems 113 and may be in continuous or continual communication with such systems. The received information may include data regarding the electronically-controlled appliance. This information associated with the electronically-controlled appliance 115 may include usage information, analytics data, remote diagnostic information or other types of data. The data may be displayed in the user interface 118. The user interface 118 allows functions of the electronically-controlled appliance 115 to be monitored by a user and/or controlled by a user. Indeed, the user can use various buttons or input fields of the user interface to control functionality or establish monitors on the electronically-controlled appliance 115.

In some cases, for example, the user interface 118 of the software application 106 allows recipes to be downloaded onto the computer system 101 and then provided to the electronically-controlled appliance 115. The user interface 118 may additionally or alternatively provide alerts for timers, probes or temperature, or may allow the user to program or make changes to a custom smoking/cooking cycle. The custom cooking cycle may specify, for example, that a meat is to be smoked at a certain temperature (e.g., low) for nine hours, then at a different temperature (e.g., high) for two hours, and then kept warm until served. Many different cooking or smoking cycles may be established and stored on the grill/smoker itself, or on the cloud service.

A user (e.g., 111) may send a customized smoking cycle to the electronically-controlled appliance 115 from anywhere in the world where the user has an internet connection. The electronically-controlled appliance 115 may receive the customized smoking cycle and begin initiating it by igniting the smoker and adding wood pellets from the hopper to the combustion area. The electronic hardware controller 116 on the electronically-controlled appliance 115 may receive the custom smoking cycle, interpret its associated instructions, and carry them out by activating an ignition switch or solenoid, by activating the hopper, or by performing other functions as necessary to carry out the customized smoking cycle.

The software application may provide a user interface 118 feature that allows the user 111 to save the customized smoking cycle to a data store on the remote computing systems 113, to the electronically-controlled appliance 115 or to data storage on the (mobile) computer system 101. The user interface 118 may further provide a feature that allows a user to initiate a recipe on the electronically-controlled appliance. The recipe may include a custom smoking/grilling cycle or may use a pre-programmed cooking cycle. The recipe may include specified smoking/grilling settings that are to be carried out by the electronically-controlled appliance 115 when preparing food according to that recipe.

The software application 106 facilitates communication between the remote computing systems 113 and the electronically-controlled appliance 115. The software application 106 transmits data packets to and receives data packets from the remote computing systems 113, and further transmits data packets to and receives data packets from the electronically-controlled appliance. The software application 106 thus enables communication between, for example, an internet site and a grill/smoker. A user using the application can select a chicken recipe on the application, and the application will communicate with the grill to run the correct cooking program. As such, the user 111 can control their electronically-controlled appliance 115 from anywhere in the world, and can allow that appliance to access internet- or cloud-provided functions directly, such as downloading or uploading recipes or custom cooking cycles.

Figure 6:
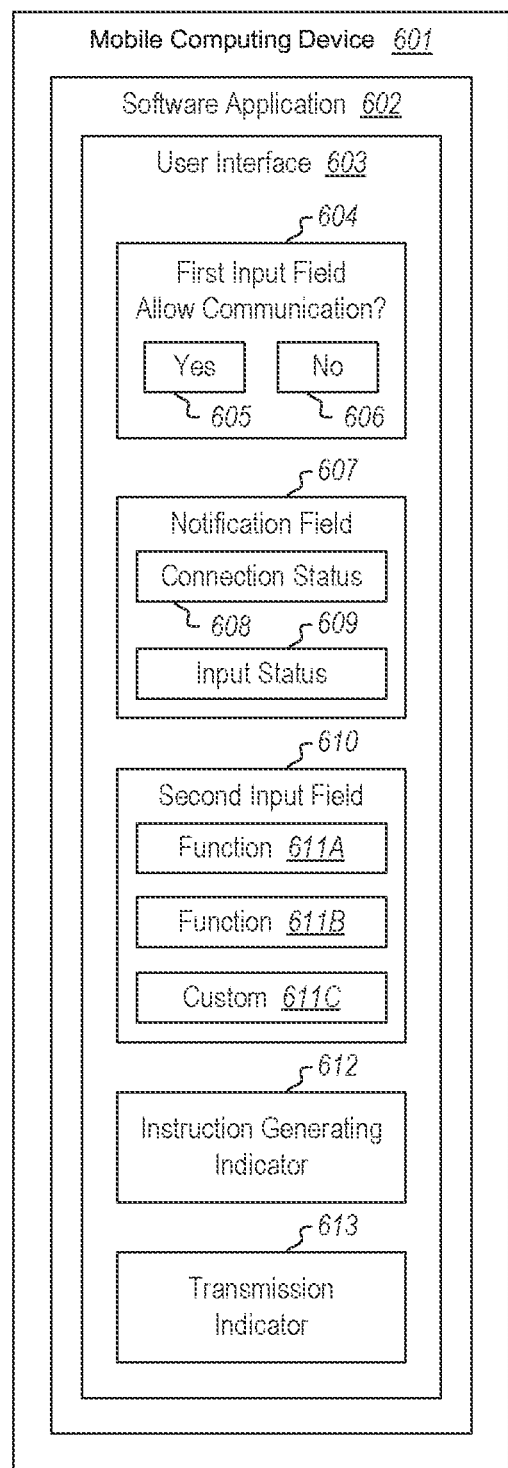
FIG. 6 illustrates a user interface for controlling an electronically-controlled appliance.

In one embodiment, a computer program product is provided which includes one or more computer storage media having thereon computer-executable instructions that, when executed by one or more processors of the computing system, cause the computing system to instantiate a user interface. One embodiment of this user interface is shown in FIG. 6.

A mobile computing device 601 such as a smart phone, tablet, laptop or wearable device may be configured to run software application 602 (which may be the same as or different than software application 106 of FIG. 1A). The software application 602 may include user interface 603. The user interface may include a first input field 604 that is configured to receive input indicating whether an electronically-controlled appliance (e.g., 115 of FIG. 1A) is permitted to communicate with one or more remote computing systems (e.g., 113). The first input field 604 may prompt the user to provide an indication whether they allow the electronically-controlled appliance 115 to communicate with the remote computing systems 113 ("Yes" 605) or not ("No" 606).

The user interface 603 of software application 602 may further include a notification field 607 configured to indicate whether the electronically-controlled appliance 115 is communicably connected to the one or more remote computing systems 113 (e.g., in connection status field 608). The user interface 603 may further provide notifications indicating that the electronically-controlled appliance 115 is available to receive instructions (e.g., in input status field 609). The instructions may come from user input at the mobile computing device 601 or may come from the remote computing systems 113.

The user interface 603 may also include a second input field 610 configured to receive input indicating that one or more specified functions (e.g., 611A, 611B, custom function 611C, etc.) are to be performed by the electronically-controlled appliance 115. The functions may include temperature monitoring and control, gas burn rate, hopper control for feeding pellets into the combustion area, timer control, or other functions. The user interface 603 may further provide an instruction generating indicator 612 configured to indicate that control instructions configured to control the electronically-controlled appliance 115 are being generated based on the functions (e.g., 611A) specified in the received user input. A transmission indicator 613 may indicate that the instructions are being sent to the electronically-controlled appliance 115 for performance of the specified functions. These functions are interpreted and carried out by the electronic hardware controller 116 on the electronically-controlled appliance.

The user interface 603 may also provide real-time additions or changes to custom cook cycles on the electronically-controlled appliance. As such, once a user has initiated a cooking/smoking cycle, the user may update that cooking cycle throughout the process and customize each part of the cooking if desired using the software application 602. In some cases, the software application 602 may receive temperature updates from a wireless cooking instrument (such as a wireless digital probe) implemented in conjunction with the electronically-controlled appliance. The user interface 603 may display these updates or alerts and may request the user to perform an action such as turning the smoker to a keep warm state so as not to overcook the food.

Accordingly, methods, systems and computer program products are provided which control an electronically-controlled appliance using a software application. Moreover, methods, systems and computer program products are provided which provide a user interface for controlling an electronically-controlled appliance.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An outdoor cooking appliance, comprising:
   a hopper;
   a combustion area, wherein the hopper is configured to provide combustible solid fuel to the combustion area; and
   at least one controller comprising:
      at least one processor; and
      at least one non-transitory computer-readable storage medium storing instructions thereon that, when executed by the at least one processor, cause the outdoor cooking appliance to:
      establish an initial connection with a mobile computing device prior to receiving permission information from the mobile computing device;
      receive the permission information from the mobile computing device to establish network communication with one or more remote computing systems;
      establish network communication with the one or more remote computing systems;
      responsive to establishing network communication with the one or more remote computing systems, terminate the initial connection with the mobile computing device;
      receive control information from the one or more remote computing systems, the control information originating from the mobile computing device; and
      responsive to receiving the control information, adjust at least one cooking characteristic of the outdoor cooking appliance.

2. The outdoor cooking appliance of claim 1, wherein the permission information is received through a direct connection between the outdoor cooking appliance and the mobile computing device.

3. The outdoor cooking appliance of claim 1, further comprising instructions that, when executed by the at least one processor, cause the at least one controller of the outdoor cooking appliance to receive the permission information over a direct connection between the outdoor cooking appliance and the mobile computing device.

4. A cloud computing system for communicating with and controlling operation of an outdoor cooking appliance comprising a hopper configured to provide combustible solid fuel into a combustion area of the outdoor cooking appliance, the cloud computing system comprising:
   at least one processor; and
   at least one non-transitory computer-readable storage medium storing instructions thereon that, when executed by the at least one processor, cause the cloud computing system to:
      establish a wireless connection with the outdoor cooking appliance after the outdoor cooking appliance has been configured to communicate with the cloud computing system;
      receive, from the mobile computing device, control information for controlling an operation of the outdoor cooking appliance;
      transmit the control information to the outdoor cooking appliance; and
      wherein the outdoor cooking appliance is authorized to communicate with the cloud computing system based on configuration information received by the outdoor cooking appliance from the mobile computing device over direct connection between the outdoor cooking appliance and mobile computing device.

5. The cloud computing system of claim 4, further comprising instructions that, when executed by the at least one processor, cause the cloud computing system to, responsive to establishing a wireless connection with the smoker, transmit an indication to the mobile computing device indicating that the wireless connection with the smoker has been established.

6. The cloud computing system of claim 5, wherein the cloud computing system transmits the indication to a dedicated software application executed on the mobile computing device.

7. The cloud computing system of claim 4, wherein in the control information is received from a dedicated software application executed on the mobile computing device.

8. The cloud computing system of claim 4, further comprising instructions that, when executed by the at least one processor, cause the cloud computing system to receive usage information from the smoker.

9. The cloud computing system of claim 8, wherein the usage information comprises information related to a locally adjusted cooking characteristic.

10. The cloud computing system of claim 9, further comprising instructions that, when executed by the at least one processor, cause the cloud computing system to transmit the information related to a locally adjusted cooking characteristic to the mobile computing device.

11. The cloud computing system of claim 9, wherein the adjusted cooking characteristic comprises a locally adjusted cooking temperature of the outdoor cooking appliance.

12. A method for controlling an outdoor cooking appliance using a software application on a remote device, the outdoor cooking appliance comprising at least one hardware controller and a hopper for providing combustible solid fuel into a combustion area of the outdoor cooking appliance, the method comprising:
   transmitting a communication to the outdoor cooking appliance, the communication containing configuration information for the outdoor cooking appliance to establish network communication with the one or more remote computing systems,
   determining a plurality of locations of the remote device relative to the outdoor cooking appliance;
   in response to determining that the remote device is within a certain distance of the outdoor cooking appliance based on a current location of the plurality of locations, directly transmitting the one or more instructions to the outdoor cooking appliance from a cloud computing system; and
   in response to determining that the remote device is outside of the certain distance of the outdoor cooking appliance based on a current location of the plurality of locations, preventing the one or more instructions from being transmitted to the outdoor cooking appliance.

13. The method of claim 12, wherein the configuration information is transmitted from the remote device to the outdoor cooking appliance over a direct connection between the remote device and the outdoor cooking appliance.

14. The method of claim 12, wherein the communication is transmitted from the remote device.

15. The method of claim 12, wherein the communication authorizes the outdoor cooking appliance to establish network communication with the one or more remote computing systems.

16. The method of claim 12, further comprising the step of transmitting an indication to the remote device indicating that the outdoor cooking appliance has established network communication with one or more remote computing systems.

17. The method of claim 12, further comprising the step of receiving a request from the outdoor cooking appliance for permission to establish network communication with the one or more remote computing systems.

* * * * *